United States Patent
Jones et al.

(10) Patent No.: US 10,269,147 B2
(45) Date of Patent: Apr. 23, 2019

(54) REAL-TIME CAMERA POSITION ESTIMATION WITH DRIFT MITIGATION IN INCREMENTAL STRUCTURE FROM MOTION

(71) Applicant: Lockheed Martin Corporation, Bethesda, MD (US)

(72) Inventors: Michael Jones, Calgary (CA); Adam James Dickin, Calgary (CA)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/582,987

(22) Filed: May 1, 2017

(65) Prior Publication Data

US 2018/0315221 A1 Nov. 1, 2018

(51) Int. Cl.
*G06K 9/00* (2006.01)
*G06T 11/00* (2006.01)
(Continued)

(52) U.S. Cl.
CPC ........ *G06T 11/005* (2013.01); *G06F 17/3028* (2013.01); *G06F 17/30256* (2013.01);
(Continued)

(58) Field of Classification Search
CPC ... G06T 11/005; G06T 7/74; G06F 17/30256; G06F 17/30268; G06F 17/3028; G06K 9/6201
See application file for complete search history.

(56) References Cited

U.S. PATENT DOCUMENTS 7,023,432 B2   4/2006   Fletcher et al.
7,230,624 B2   6/2007   Lengyel
(Continued)

FOREIGN PATENT DOCUMENTS

CA   2530187 A1    2/2005
CN   103345382 A   10/2013
(Continued)

OTHER PUBLICATIONS

Umeyama, Shinji, "Least-Squares Estimation of Transformation Parameters Between Two Point Patterns", *IEEE Transactions on Pattern Analysis and Machine Intelligence* 13.4 (1991), pp. 376-380.

(Continued)

*Primary Examiner* — Phuoc Tran
(74) *Attorney, Agent, or Firm* — Miles & Stockbridge PC

(57) ABSTRACT

A system provides camera position and point cloud estimation 3D reconstruction. The system receives images and attempts existing structure integration to integrate the images into an existing reconstruction under a sequential image reception assumption. If existing structure integration fails, the system attempts dictionary overlap detection by accessing a dictionary database and searching to find a closest matching frame in the existing reconstruction. If overlaps are found, the system matches the images with the overlaps to determine a highest probability frame from the overlaps, and attempts existing structure integration again. If overlaps are not found or existing structure integration fails again, the system attempts bootstrapping based on the images. If any of existing structure integration, dictionary overlap detection, or bootstrapping succeeds, and if multiple disparate tracks have come to exist, the system attempts reconstructed track merging.

20 Claims, 18 Drawing Sheets

(51) Int. Cl.
G06K 9/62 (2006.01)
G06T 7/73 (2017.01)
G06F 17/30 (2006.01)
G06T 15/00 (2011.01)
G06T 15/20 (2011.01)
G06T 17/20 (2006.01)

(52) U.S. Cl.
CPC ..... G06F 17/30268 (2013.01); G06K 9/6201 (2013.01); G06T 7/74 (2017.01); G06T 15/005 (2013.01); G06T 15/205 (2013.01); G06T 17/20 (2013.01); G06T 2207/10028 (2013.01); G06T 2207/30244 (2013.01); G06T 2210/52 (2013.01); G06T 2215/16 (2013.01)

(56) References Cited

U.S. PATENT DOCUMENTS

| | | |
|---|---|---|
| 7,831,094 B2 | 11/2010 | Gupta et al. |
| 8,213,706 B2 | 7/2012 | Krishnaswamy et al. |
| 8,787,682 B2 | 7/2014 | Yang et al. |
| 8,798,357 B2 | 8/2014 | Sinha et al. |
| 9,064,323 B2 | 6/2015 | Xu et al. |
| 9,124,778 B1 | 9/2015 | Crabtree |
| 9,148,650 B2 | 9/2015 | Chandraker et al. |
| 9,177,368 B2 | 11/2015 | Cabral et al. |
| 9,727,824 B2 | 8/2017 | Rose et al. |
| 2007/0031064 A1* | 2/2007 | Zhao ............... G06K 9/00214 382/285 |
| 2007/0288141 A1 | 12/2007 | Bergen et al. |
| 2008/0117212 A1 | 5/2008 | Woo et al. |
| 2009/0263009 A1 | 10/2009 | Krishnaswamy et al. |
| 2010/0156901 A1 | 6/2010 | Park et al. |
| 2013/0060540 A1 | 3/2013 | Frahm et al. |
| 2013/0124147 A1 | 5/2013 | Jin et al. |
| 2014/0078258 A1 | 3/2014 | Chandraker et al. |
| 2014/0212001 A1 | 7/2014 | Perlin et al. |
| 2017/0039765 A1* | 2/2017 | Zhou ................. G06T 19/006 |
| 2017/0046833 A1 | 2/2017 | Lurie et al. |

FOREIGN PATENT DOCUMENTS

| | | |
|---|---|---|
| WO | WO 2006/002322 A2 | 1/2006 |
| WO | WO 2015/143661 A1 | 10/2015 |

OTHER PUBLICATIONS

Norouzi, Mohammad, Ali Punjani, and David J. Fleet, "Fast Search in Hamming Space with Multi-Index Hashing", *Computer Vision and Pattern Recognition* (CVPR), 2012 IEEE Conference, 8 pages.
Galvez-Lopez, Dorian, and Juan D. Tardos, "Bags of Binary Words for Fast Place Recognition in Image Sequences", *IEEE Transactions on Robotics* 28.5 (2012), pp. 1188-1197.
Nister, David, "An Efficient Solution to the Five-Point Relative Pose Problem", *IEEE Transactions on Pattern Analysis and Machine Intelligence* 26.6 (2004), pp. 756-770.
Li, Hongdong, and Richard Hartley, "Five-Point Motion Estimation Made Easy", $18^{th}$ *International Conference on Pattern Recognition* (ICPR'06), vol. 1, IEEE, 2006, 4 pages.
Segvoc, Sinisa, Gerald Schweighofer, and Axel Pinz, "Performance Evaluation of the Five-Point Relative Pose with Emphasis on Planar Scenes", *Proceedings of the workshop of the Austrian Association for Pattern Recognition*, Schloss Krumbach, Austria, 2007, 43 pages.
Huang, Thomas S., and Arun N. Netravali, "Motion and Structure from Feature Correspondences: A Review", *Proceedings of the IEEE* 82.2 (1994), pp. 252-268.
Bhaskaran, Avinash, and Anusha Sridhar Rao, "Structure from Motion using Uncalibrated Cameras", 4 pages.
Chang, Wen-Yan, and Chu-Song Chen, "Pose Estimation for Multiple Camera Systems", Pattern Recognition, 2004, ICPR 2004, *Proceedings of the $17^{th}$ International Conference on Pattern Recognition*, vol. 3, Aug. 2004, pp. 262-265.
Zhang, Zhengyou, "Motion and Structure from Two Perspective Views: From Essential Parameters to Euclidean Motion Through the Fundamental Matrix", *JOSA A*, vol. 14, No. 11 (1997), pp. 2938-2950.
Nister, D. "Preemptive RANSAC for Live Structure and Motion Estimation", Ninth *IEEE International Conference on Computer Vision*, 2003, pp. 199-206, 8 pages.
Haralick, Robert M., et al., "Review and Analysis of Solutions of the Three Point Perspective Pose Estimation Problem", *International Journal of Computer Vision* 13.3 (1994), pp. 331-356.
Gao, Xiao-Shan et al., "Complete Solution Classification for the Perspective-Three-Point Problem", *IEEE Transactions on Pattern Analysis and Machine Intelligence* 25.8 (2003), 33 pages.
Kneip, Laurent, Davide Scaramuzza, and Roland Siegwart, "A Novel Parametrization of the Perspective-Three-Point Problem for a Direct Computation of Absolute Camera Position and Orientation", *Computer Vision and Pattern Recognition*, 2011 IEEE Conference, 8 pages.
Hoppe, Christof, et al., "Online Feedback for Structure-from-Motion Image Acquisition", BMVC, vol. 2, 2012, 12 pages.
Kneip, Laurent, and Simon Lynen, "Direct Optimization of Frame-to-Frame Rotation", *Proceedings of the IEEE International Conference on Computer Vision*, 2013, pp. 2352-2359.
Wu, Changchang, "Towards Linear-Time Incremental Structure from Motion", *2013 International Conference on 3D Vision-3DV 2013*, IEEE, 2013, 8 pages.
Hoppe, Christof, et al., "Incremental Surface Extraction from Sparse Structure-from-Motion Point Clouds", BMVC, 2013, 1 page.
Forster, Christian, et al., "Collaborative Monocular SLAM with Multiple Micro Aerial Vehicles", 2013 *IEEE/RSJ International Conference on Intelligent Robots and Systems*, IEEE, 2013, 12 pages.
Hartley, Richard I., "Estimation of Relative Camera Positions for Uncalibrated Cameras", *European Conference on Computer Vision*, Springer Berlin Heidelberg, 1992, 9 pages.
Yu, Shuda, and Maxime Lhuillier, "Incremental Reconstruction of Manifold Surface from Sparse Visual Mapping", 2012 *Second International Conference on 3D Imaging, Modeling, Processing, Visualization & Transmission*, IEEE, 2012, 8 pages.
Ma, Lingni, et al., "Planar Simplification and Texturing of Dense Point Cloud Maps", Mobile Robots (ECMR), 2013 *European Conference*, IEEE, 2013, 8 pages.
Nister, David, Oleg Naroditsky, and James Bergen, "Visual Odometry for Ground Vehicle Applications", *Journal of Field Robotics* 23.1 (2006): 3-20, 35 pages.
Nister, D., O. Naroditsky, and J. Bergen, "Visual Odometry", Computer Vision and Pattern Recognition, 2004, CVPR 2004, *Proceedings of the 2004 IEEE Computer Society Conference*, 2004, pp. 1-652-1-659, vol. 1, doi: 10.1109/CVPR.2004.1315094, 8 pages.
Sauer, Olivier, Marc Pollefeys, and Gim Hee Lee, "A Minimal Solution to the Rolling Shutter Pose Estimation Problem", *Intelligent Robots and Systems* (IROS), 2015 *IEEE/RSJ International Conference*, IEEE, Sep. 2015, 8 pages.
Romanoni, Andrea and Matted Matteucci, "*Incremental Reconstruction of Urban Environments by Edge-Points Delaunay Triangulation*", Intelligent Robots and Systems (IROS), 2015 IEEE/RSJ International Conference on Sep. 28-Oct. 2, 2015, 7 pages.
Botterill, Tom, Stephen Milles, and Richard Green, "Correcting Scale Drift by Object Recognition in Single-Camera SLAM", IEEE Transactions on *Cybernetics*, vol. 43, Issue 6, Dec. 2013, 1 page.
Pollefeys, M., et al., "Detailed Real-Time Urban 3D Reconstruction from Video", Department of Computer Science, University of North Carolina, 43 pages.
U.S. Appl. No. 15/583,043, May 1, 2017, Jones et al.
U.S. Appl. No. 15/583,074, May 1, 2017, Jones.
Office Action dated Aug. 10, 2018, in U.S. Appl. No. 15/583,043.
Notice of Allowance dated Sep. 25, 2018, in U.S. Appl. No. 15/583,074.
David G. Lowe, "Distinctive Image Features from Scale-Invariant Keypoints", Univ. of British Columbia, Vancouver, BC, Canada; Int'l Journal of Computer Vision, 2004, pp. 1-28.

(56) References Cited

OTHER PUBLICATIONS

Hyon Lim et al., "Real-Time 6 DOF Monocular Visual SLAM in a Large-Scale Environment", Jun. 7, 2014, IEEE, (2014).
Office Action dated Feb. 21, 2019, in U.S. Appl. No. 15/583,043.

* cited by examiner

REAL-TIME CAMERA POSITION ESTIMATION WITH DRIFT MITIGATION IN INCREMENTAL STRUCTURE FROM MOTION

FIELD

One embodiment is directed generally to image reconstruction, and in particular, to real-time three-dimensional ("3D") reconstruction.

BACKGROUND INFORMATION

The advent of high-performance processors has led to systems that can perform 3D reconstruction of images. Generally, 3D reconstruction from multiple images refers to the creation of 3D models from a set of images, and is the reverse process of obtaining two-dimensional ("2D") images from 3D scenes. Some 3D reconstruction systems incorporate texture mapping which refers to a method for defining high frequency detail surface texture or color information on a computer generated graphic or 3D model. A textured model is a computer generated graphic or 3D model obtained by texture mapping. Some 3D reconstruction systems provide a level-of-detail texture model. Level-of-detail refers to decreasing the complexity of a 3D model representation as it moves away from the viewer or according to other metrics such as object importance, viewpoint-relative speed, or position.

Some 3D reconstruction systems implement structure from motion ("SfM") techniques. SfM refers to recreating a 3D high-resolution model (i.e., a "reconstruction") from nothing but a stream of images (e.g., still captures or sampled video frames) and knowledge of the intrinsic parameters of a camera. Intrinsic parameters of a camera describe the math that models how a camera lens bends light. Generally, extrinsic camera calibration is based on where the camera is when it acquired the image, and its orientation, relative to some frame of reference. On the other hand, an intrinsic calibration provides a set of coefficients that serve as a mathematical description of the lens, whether fisheye or perspective, or another model. Intrinsic calibration accounts for both linear and non-linear components of a camera's optics. With reference to the non-linear component, many cameras stretch images towards the corners. This effect can be corrected by modeling the lens distortion of that camera, such as using the Brown model for radial and tangential distortion. The linear component (in a pinhole camera) pertains to, at least, the focal length and principle point, and can include per-axis focal lengths as well as skew. This is a linear system that describes how to convert a Euclidean ray that originates at the optical center of the camera into a 2D pixel coordinate. These rays are used to extract camera positions and the shape of objects in view from pixels in the images that are found as keypoints during feature detection and matching. This is done by taking advantage of the geometrical relationships between cameras and the points that they observe. A keypoint is the location in the image of an interesting feature (sometimes called an interest point or a "corner").

SfM provides a photogrammetric range imaging technique for estimating 3D structures from 2D image sequences that may be coupled with local motion signals. In biological vision, SfM refers to the phenomenon by which humans (and other living creatures) can recover 3D structure from the projected 2D (retinal) motion field of a moving object or scene.

An example is creating a 3D point cloud, a textured mesh of that cloud, and recreating the relative (or absolute) position of the sensor for each source image. A point cloud refers to a set of world points. A world point is a Cartesian representation of a location in 3D space (e.g., (x,y,z)) of a triangulated feature. The term "world" refers to the frame of reference context for the point, in that the point is situated in, and defined with respect to, some Cartesian coordinate system, and this basis frame of reference defines a new relative "world" in which to spatially relate points. That is, the world point represents a single point in a reconstructed structure in 3D space, and is representable as a 3D vector. Triangulation refers to the process of using two or more camera poses with corresponding matched features across those poses to determine the location of a world point relative to a frame of reference of the camera poses. Generally, the combination of position and orientation of an object relative to some coordinate system is referred to as a pose of the object, even though this concept is sometimes used only to describe the orientation. Relative pose refers to relative camera motion between two calibrated views. A mesh refers to the 3D shape of a model. Texture represents a sheet lying on the surface of the model. Further details may be painted on the texture. A textured mesh is a mesh with a texture added thereon.

Generally, an image processing system may include a graphics processing unit ("GPU"). A GPU, occasionally called a visual processing unit ("VPU"), is a specialized electronic circuit designed to rapidly manipulate and alter memory to accelerate the creation of images in a frame buffer intended for output to a display device. GPUs are used in embedded systems, mobile phones, personal computers, workstations, and game consoles. Modern GPUs are very efficient at manipulating computer graphics and image processing, and their highly parallel architecture makes them more efficient than general purpose central processing units ("CPUs") for algorithms where the processing of large blocks of data is done in parallel. In a personal computer, a GPU can be present on a video card, or it can be embedded on the motherboard or, in certain CPUs, on the CPU die. A GPU global memory is a local memory storage on a GPU device that is accessible to all threads that execute on that GPU. In one example, in GPUs provided by NVIDIA Corp. of Santa Clara, Calif., the global memory is accessible to CUDA® kernels executing in parallel. CUDA® is a parallel computing platform and application programming interface ("API") model created by NVIDIA Corp. of Santa Clara, Calif.

GPUs may be a "programmable logic chip" and may be implemented with programmable logic controllers ("PLCs"). However, GPUs such as those provided by NVIDIA are not PLCs, but rather a sort of specialized general purpose computer. There is no change in the circuit mappings in these GPUs, and they are programmed generically, such as with central graphics ("Cg"), open graphics library shading language ("GLSL"), CUDA®, open computing language ("OpenCL"), and other languages, even though they are designed for certain special tasks. Generally, CUDA® is one tool that can be used for GPU acceleration. However, the same functionality may be provided, for example, with OpenCL on graphics cards from both NVIDIA and Advanced Micro Devices ("AMD") Inc. of Sunnyvale, Calif.

SUMMARY

One embodiment is a system that provides camera position and point cloud estimation for 3D reconstruction. The system receives images and attempts existing structure integration to integrate the images into an existing reconstruction under a sequential image reception assumption. If existing structure integration fails, the system attempts dictionary overlap detection by accessing a dictionary database and searching to find a closest matching frame in the existing reconstruction. If overlaps are found, the system matches the images with the overlaps to determine a highest probability frame from the overlaps, and attempts existing structure integration again. If overlaps are not found or existing structure integration fails again, the system attempts bootstrapping based on the images. If any of existing structure integration, dictionary overlap detection, or bootstrapping succeeds, and if multiple disparate tracks have come to exist, the system attempts reconstructed track merging.

DETAILED DESCRIPTION

Embodiments generate a 3D reconstruction as a textured model, in real or near-real time as the imagery is obtained, and place that model in a 3D visualization of the earth from live imagery (e.g., still images or video) from a manned or unmanned vehicle. Accordingly, embodiments allow for fast decision making by providing rapid feedback for inspection (e.g., in commercial applications), reconnaissance (i.e., military observation of a region to locate an enemy or ascertain strategic features), disaster relief, or other time-sensitive operations.

Figure 1:
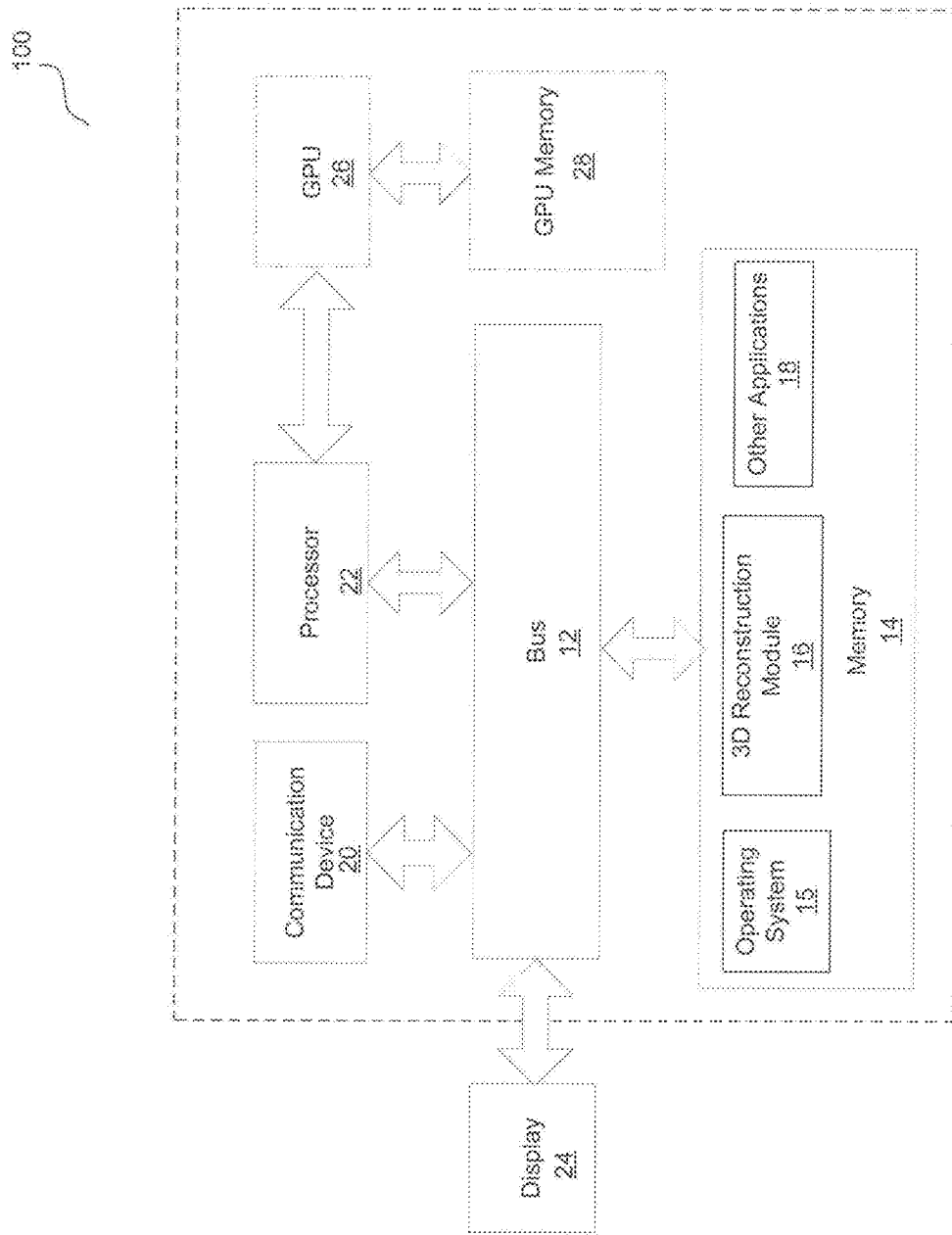
FIG. 1 is a block diagram of a computer server/system in accordance with an embodiment of the present invention.

FIG. 1 illustrates a block diagram of a system 100 in accordance with one embodiment of the invention. In some embodiments, system 100 may function as a 3D reconstruction system as disclosed below. In these embodiments, system 100 may not include one or more of the modules depicted in FIG. 1, such as a display 24.

Although shown as a single system, the functionality of system 100 can be implemented as a distributed system. System 100 includes a bus 12 or other communication mechanism for communicating information, and a processor 22 coupled to bus 12 for processing information. Processor 22 may be any type of general or specific purpose processor. System 100 further includes a memory 14 for storing information and instructions to be executed by processor 22. Memory 14 can be comprised of any combination of random access memory ("RAM"), read only memory ("ROM"), static storage such as a magnetic or optical disk, or any other type of transitory or non-transitory computer-readable medium.

A computer-readable medium may be any available medium that can be accessed by processor 22 and may include both a volatile and nonvolatile medium, a removable and non-removable medium, a communication medium, and a storage medium. A communication medium may include computer-readable instructions, data structures, program modules, or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disks, removable disks, compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 100, as well as the rest of a mobile device in one embodiment. The modules further include a 3D reconstruction module 16 that provides 3D reconstruction functionality, as disclosed in more detail herein. In certain embodiments, 3D reconstruction module 16 may comprise a plurality of modules, where each module provides specific individual functionality for providing a 3D reconstruction.

System 100, in embodiments that transmit and/or receive data from remote sources, further includes a communication device 20, such as a network interface card, to provide mobile wireless network communication, such as infrared, radio, Wi-Fi, cellular network communication, etc. In other embodiments, communication device 20 provides a wired network connection, such as an Ethernet connection, a modem, etc.

Processor 22 is further coupled via bus 12 to a display 24, such as a Liquid Crystal Display ("LCD"), for displaying a graphical representation or user interface ("UI") to a user. Display 24 may be a touch-sensitive input device, such as a touch screen, configured to send and receive signals from processor 22.

In one embodiment, system 100 further includes a GPU 26 that is coupled with a GPU memory 28. In this embodiment, processor 22 (e.g., a CPU) may be coupled with GPU 26 through a bridge which typically provides high speed communications between processor 22 and GPU 26. Alternatively, processor 22 may be coupled with GPU 26 through any other means known in the art. System 100 may include more than one processor 22 and/or more than one GPU 26.

In some embodiments, 3D reconstruction functionality may run in parallel threads on processor 22 and GPU 26 to provide results in real-time. In an alternative embodiment, however, 3D reconstruction functionality may run entirely on one processor 22 (e.g., an Intel CPU). That is, rather than deploying some parts to GPU 26, the embodiment uses CPU versions of those parts that it executes in parallel threads. However, this embodiment may not operate in real-time, as it is slower in practice (for example, 3-30 times slower).

Generally, some known systems may provide offline and cloud-based solutions where 3D reconstructions are performed after a vehicle returns and all data is collected. The 3D reconstructions may be used, for example, for commercial or military operations that require up-to-date maps and elevation models. Since inspection may be impossible on a large number (e.g., thousands) of overlapping images, some applications may require the reconstruction to happen as soon as possible to enable good data capture and fast decision making. However, some known systems may only have portable hardware available. Further, in some cases, data cannot be uploaded to a third party cloud due to cost and/or security reasons, therefore making cloud-based solutions undesirable. Some known systems use information from a hardware sensor to determine positioning and reconstruction. However, access to an inertial measurement unit ("IMU") or a global positioning system ("GPS") on an image collection vehicle (e.g., a drone) may not be guaranteed. An IMU is an electronic device that measures and reports a body's specific force, angular rate, and sometimes the magnetic field surrounding the body, using a combination of accelerometers and gyroscopes, and sometimes magnetometers. In some cases, the reconstruction needs to provide a high level of detail (e.g., with a centimeter ground sample distance). Further, there may be moving objects (e.g., vehicles, trees, etc.), therefore totally rigid scenes cannot be assumed.

In contrast to the known systems, embodiments provide real-time 3D reconstruction that does not require cloud computing and can run, for example, on a local standalone computing platform such as a desktop computer. Accordingly, the requirement for data transfer is substantially reduced, and embodiments provide privacy by allowing customers to keep all data local. Embodiments produce reconstructions as images are acquired, and therefore decision making may be performed much sooner as compared to the known offline 3D reconstruction approaches. Embodiments may run on commercial hardware that is relatively inexpensive. Embodiments produce a level-of-detail textured model in real-time, whereas the known systems cannot produce a level-of-detail rendering. Since embodiments are real-time, they allow for navigational assist in situations such as when a GPS is unavailable (i.e., a GPS-denied situation).

Figure 2:
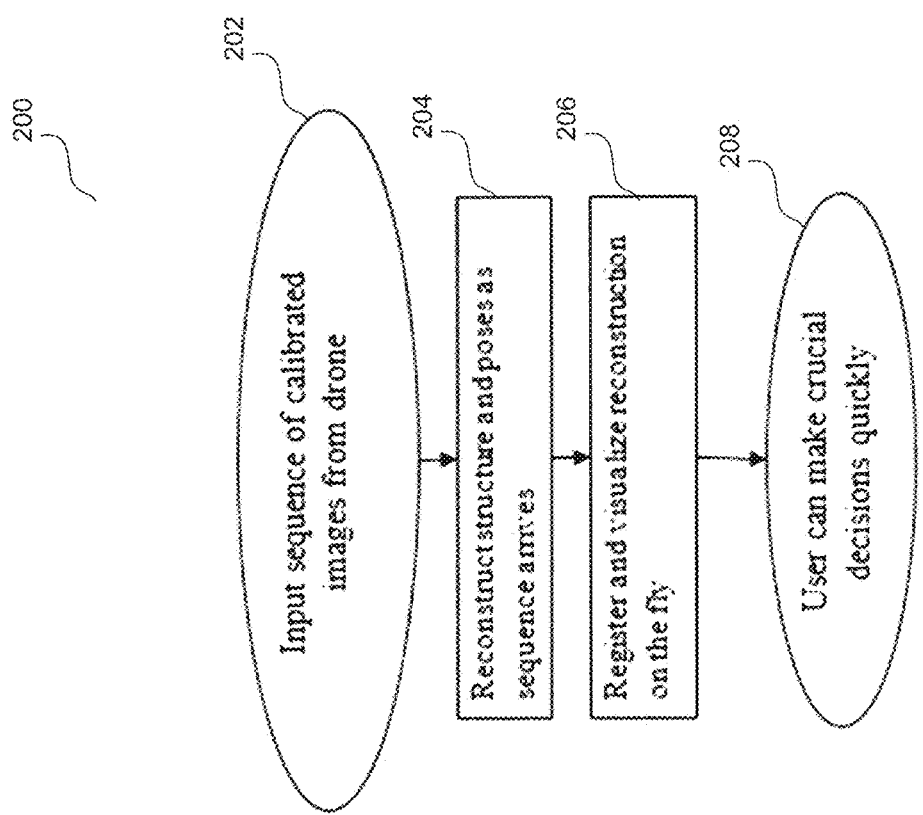
FIG. 2 illustrates a block diagram of an example application of 3D reconstruction in one embodiment.

FIG. 2 illustrates a flow diagram 200 of an example application of 3D reconstruction in one embodiment. In one embodiment, the functionality of the flow diagram 200 of FIG. 2, or any other flow diagram described below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Figure 3A:
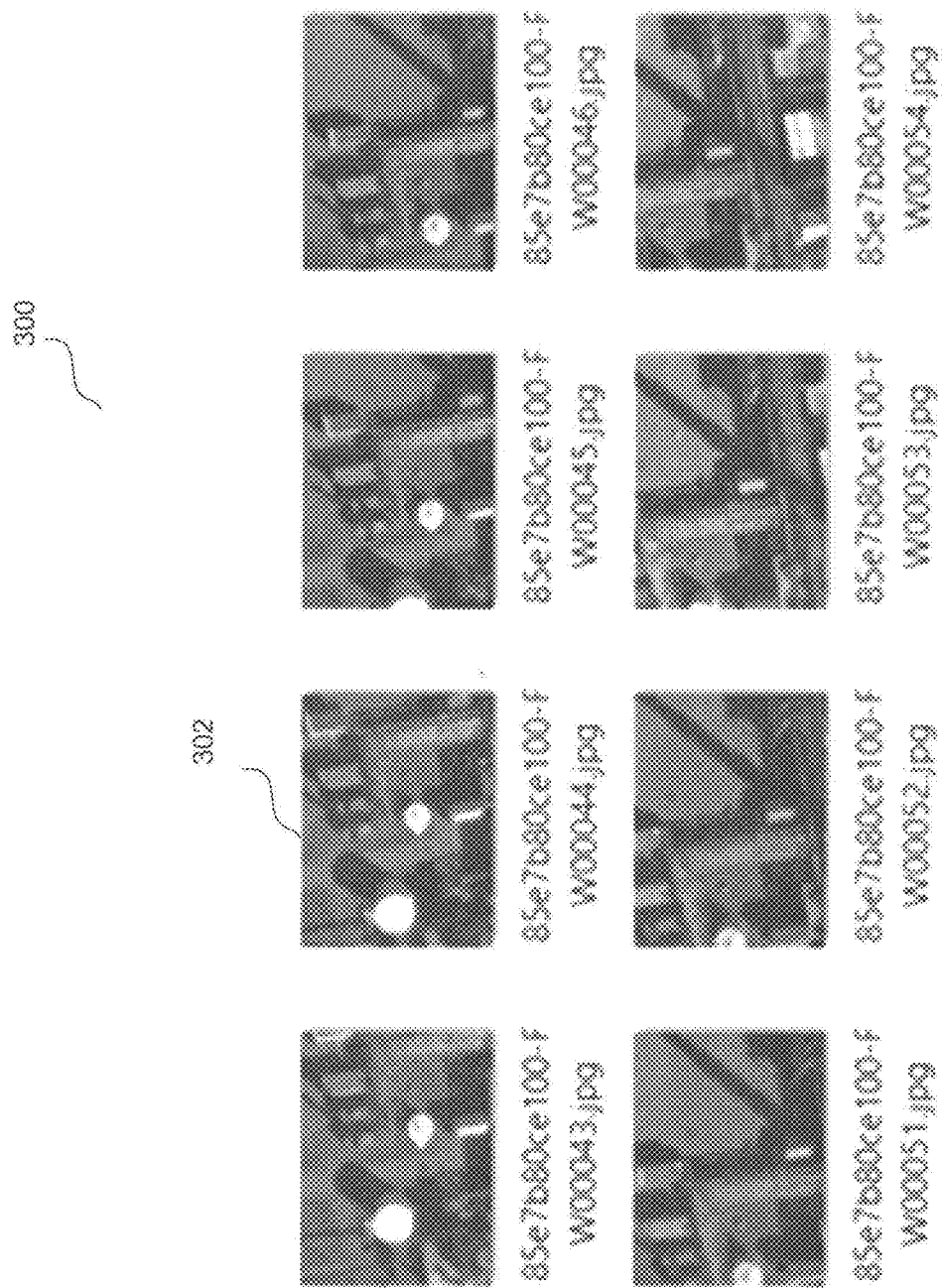
FIGS. 3A and 3B respectively illustrate an example sequence of images captured by a drone and an example sequence of visualizations of 3D reconstructions.
Figure 3B:
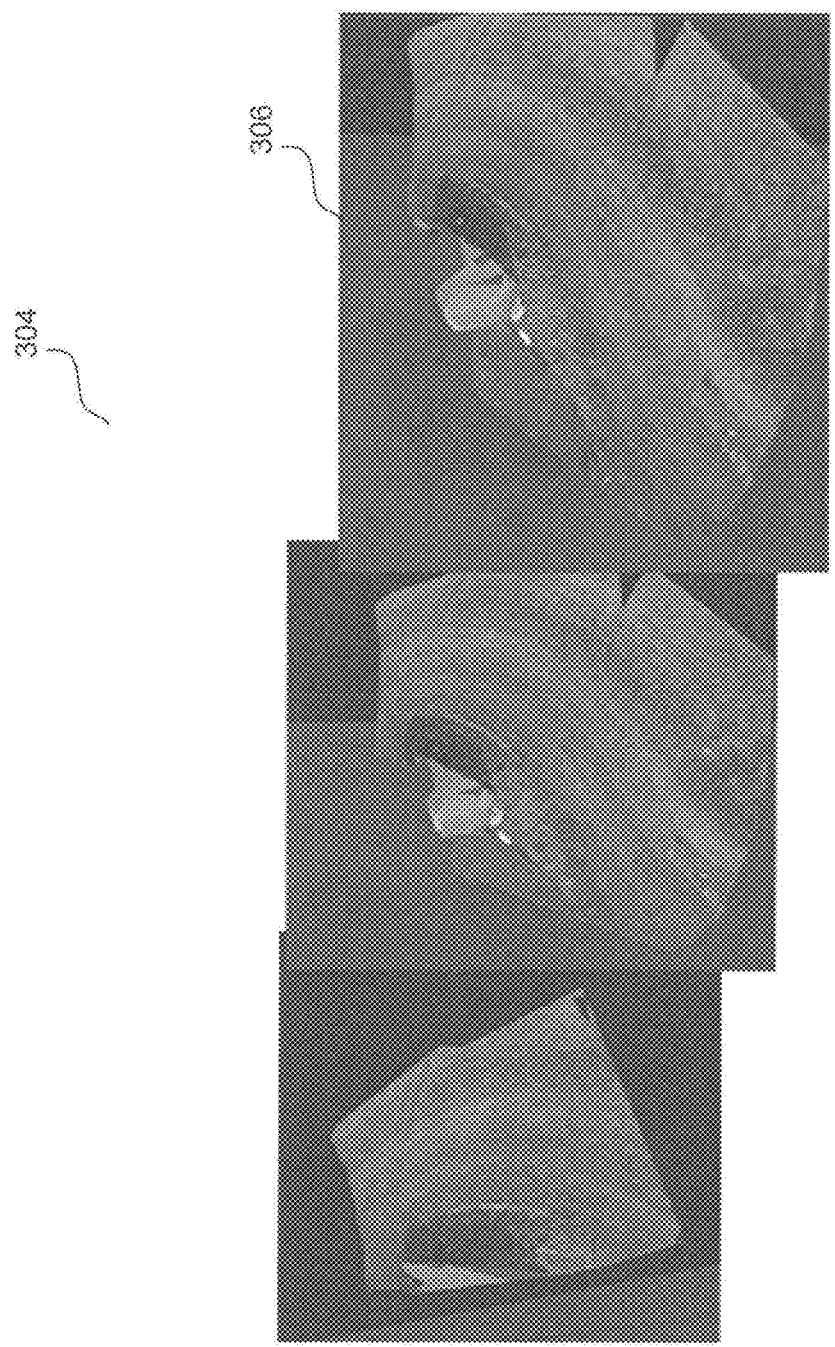

The embodiment allows for making decisions based on 3D reality models from imagery from a drone (or other optical source) as soon as possible for inspection, disaster relief, military operations, etc. The embodiment uses a highly parallelized GPU-accelerated SfM to create a high-detail 3D model of reality in real-time from imagery obtained on the fly from a drone. At 202 a sequence of calibrated images is received from a drone. At 204 structure and poses are reconstructed as the sequence of images arrives. In one embodiment, structure and poses are reconstructed by placing a 3D reconstruction on the earth using, e.g., ground control points (points on the surface of the earth of known location), and rendering or visualizing the reconstruction. At 206 a 3D reconstruction is registered and visualized on the fly (as described below with reference to the maintenance pipeline), and at 208 a user can make crucial decisions based on the rendering. Registration, in this context, refers to the process of determining a location on the 3D earth at which to visualize the reconstruction, and may be performed, for example, via alignment with known terrain models or alignment between relative reconstructed camera positions and GPS positions provided as metadata with the images. One embodiment does not need metadata from the drone and does not use GPS metadata to help reconstruct but only to place a reconstruction on the 3D earth. In this embodiment, if metadata is not available, ground control points ("GCPs") can be used to align it, or the reconstruction is rendered at an assumed location of (0,0). FIGS. 3A and 3B respectively illustrate an example sequence 300 of images 302 captured by a drone and an example sequence 304 of visualizations 306 of 3D reconstructions.

One embodiment provides a highly threaded, asynchronous, load-balancing CUDA®-accelerated engine for providing monocular sequential SfM, completed with textured mesh generation. A highly-threaded engine refers to an engine that provides a large number of low-overhead hardware threads with low-overhead context switching between them. Asynchronous tasks are tasks that when executed, do not block the execution of other tasks. The threading model employed in the embodiments uses pipeline staging to avoid the use of critical sections and mutexes, thus enabling faster operations. A pipeline is a set of data processing elements connected in series, where the output of one element is the input of the next one. A graphics pipeline or rendering pipeline refers to the sequence of steps/stages used to create a 2D raster representation of a 3D scene. Critical sections or critical regions are protected sections of a program that access a shared resource and therefore cannot be executed by more than one process. A mutex refers to a mutual exclusion object. Mutual exclusion is a property of concurrency control, which is instituted for the purpose of preventing race conditions by requiring that one thread of execution never enters its critical section at the same time that another concurrent thread of execution enters its own critical section.

In one embodiment, a large number of feature points are extracted from imagery in parallel, and are used to determine an initial relative pose of the sensor (e.g., camera). Relative pose estimation (e.g., planar and non-planar, 10 point, non-minimal, etc.) is the process of determining the relative location of a second camera (in terms of rotation and translation) relative to a basis camera with a basis frame of reference. This may be performed using a set of matching features between the two frames. One embodiment implements a relative pose estimator that is noise-resistant and can use features that correspond to world points sharing the same plane, and is therefore planar insensitive. An example of such a relative pose estimator is the "10 point algorithm" disclosed by Laurent Kneip et al., "Direct optimization of frame-to-frame rotation," 2013 Institute of Electrical and Electronics Engineers ("IEEE") International Conference on Computer Vision ("ICCV").

The relative pose is further refined through inlier tightening, a sequence of parallelized evaluation of triangulations, and non-linear refinement with variable error margins, to arrive at a more stable pose, at which point error is dramatically reduced. An inlier is an observation which is not an outlier. An outlier is an observation that is numerically distant from the rest of the data. In one embodiment, an outlier is an observation for which a reprojection error or angular error between the expected feature location and the actual feature location exceeds a corresponding threshold. Inlier tightening may be performed, for example, on features detected by a feature detector as disclosed by David G. Lowe, "Distinctive Image Features from Scale-Invariant Keypoints," Computer Science Department, University of British Columbia, Vancouver, British Columbia, Canada, Jan. 5, 2004.

In one embodiment, a ratio check may be implemented to exclude some outliers during feature matching by comparing the ratio of Euclidean distances between match candidates, namely, the Euclidean distance between the closest matching feature to the feature in question, and the Euclidean distance between the second closest matching feature. Then, this ratio can be set to a threshold that excludes many bad matches. However, many poor matches can still pass a ratio test. Inlier tightening loosens the error threshold upon triangulated points to allow greater inclusion of world points given that the pose may itself be slightly erroneous. Non-linear pose refinement is performed under the statistical assumption that the good matches will be prevalent, thus producing a more accurate pose even with outliers. This increasingly accurate pose can in turn be used to re-evaluate all triangulated points, eliminating more outliers, and leading to an even more accurate pose, and so on. Non-linear pose refinement is the process of improving a pose's location (a translation and rotation) by minimizing the reprojection error of world points into that pose. This minimizing may be performed, for example, by a Levenberg-Marquardt minimization of the errors through iterative refinement of the pose. The Levenberg-Marquardt minimization interpolates between the Gauss-Newton algorithm and the method of gradient descent.

From this "bootstrapped" world, as defined as a relative Cartesian frame of reference defined by the basis frame of reference of the initial recovered pair of relative poses, absolute poses are inferred by an absolute pose estimator based on the triangulated points (world points). Absolute pose estimation refers to the problem of estimating the pose of a calibrated camera given a set of "n" 3D points in the world and their corresponding 2D projections in an image. An absolute perspective-n-point ("PnP") estimator determines a camera location from "n" known world points. The camera pose includes 6 degrees-of-freedom ("DOF") which include the rotation (roll, pitch, and yaw) and the 3D translation of the camera with respect to the world. This problem may be solved with a minimum of 3 points (thus a "P3P"), as disclosed, for example, by Laurent Kneip et al., "A novel parametrization of the perspective-three-point problem for a direct computation of absolute camera position and orientation," 2011 IEEE Conference on Computer Vision and Pattern Recognition ("CVPR").

The absolute poses are subsequently subjected to a similar inlier tightening scheme which includes refining the pose with an increasing number of points by initially starting out with a loose error threshold to include more points and evaluating those points with tighter thresholds to continually refine the pose while including increasingly superior triangulations and excluding poor triangulations on the basis of the increasingly superior pose.

Simultaneously, massively parallel feature matching is used to link the new initial absolute pose to several (e.g., up to dozens) of other frames in its vicinity to maximize inclusion of data. Massively parallel refers to the use of a large number of processors (or multi-core processor, whether CPU or CPU, or separate computers) to perform a set of coordinated computations in parallel (simultaneously). A massively parallel process may be distributed on multiple computers or may be distributed on GPUs and CPUs on a single local computer. A parallelized feature matcher is an implementation of feature matching that is highly parallelized to be efficient. One embodiment provides real-time multi-image matching as described below.

This new data is used in the inlier tightening/re-estimation of that pose. This is separately performed for each per-overlapping pose, thus enabling the inclusion of inliers. Generally, slight warping in the initial pose causes over-rejection if inliers are initially evaluated for all frames against a single refined pose. However, by performing inlier tightening independently and in parallel over all overlapping frames using the initial absolute pose as the starting point, embodiments allow each overlapping frame to independently contribute inliers without being warped by the others. Then, the results are combined together for bundle adjustment which simultaneously corrects all inlier points and overlapping poses. After performing the inlier tightening/re-estimation, new triangulations are then generated for the new pose (using both new points and the existing points that are seen that exist in up to, for example, dozens of other frames).

All viable world points are then used to perform non-linear refinement on the network of poses in the vicinity, which is a key step for producing a stable starting point for bundle adjustment. Given a set of images depicting a number of 3D points from different viewpoints, bundle adjustment refers to simultaneously refining the 3D coordinates describing the scene geometry, the parameters of the relative motion, and the optical characteristics of the camera(s) employed to acquire the images, according to an optimality criterion involving the corresponding image projections of all points. Bundle adjustment minimizes the reprojection error between the image locations of observed and predicted image points, which is expressed as the sum of squares of a large number of nonlinear real-valued functions. In one embodiment, the minimization is achieved using nonlinear least-squares algorithms, such as the Levenberg-Marquardt, which is easy to implement and uses an effective damping strategy that lends it the ability to converge quickly from a wide range of initial guesses.

Finally, a highly parallel bundle adjustment step is run on the network of triangulated points and poses (not on the whole reconstruction) for each overlapping frame in relationship to the new frame. Accordingly, embodiments lock the poses that do not overlap directly but observe world points in the overlapping frames being refined during bundle adjustment. That is, embodiments do not modify these poses during bundle adjustment, but use them to evaluate reprojection error to help prevent bias during bundle adjustment.

Moreover, at the same time, embodiments incrementally generate an extracted surface (a mesh of the nodes), modifying it for each new frame, taking into account visibility information, while generating a level-of-detail-based data structure for visualizing the growing reconstruction in line with a 3D world while it is being created. Embodiments can recover from failures to reconstruct by adaptively integrating new frames into existing reconstructions, and merging two reconstructions that overlap. Embodiments also enable live densification by integrating more images of an area as the images are acquired, to increase the detail. Embodiments also provide optimal alignment to vehicle position metadata supplied per image (for example, coordinates in exchangeable image file format ("EXIF") data in joint photographic experts group ("JPEG") images) for visualization, so as to immediately visualize the mesh on the 3D earth in approximately its geographical location and orientation.

Embodiments are applicable for enabling commercial inspection with unmanned systems for example. Embodiments are also applicable in forestry, agriculture, construction, oil and gas, and through service providers. Embodiments are applicable for providing real-time topography and map generation for control stations, and can enable rapid site assessment for military operations (e.g., by building a model of a beach before landing on it). Embodiments provide rapid mapping and change analysis to help inform better decisions in disaster relief efforts. Embodiments are applicable as a commercial front-end for a Geospatial Information System ("GIS") backend. Embodiments are applicable for commercial inspection.

Parallel Pipelines

Figure 4:
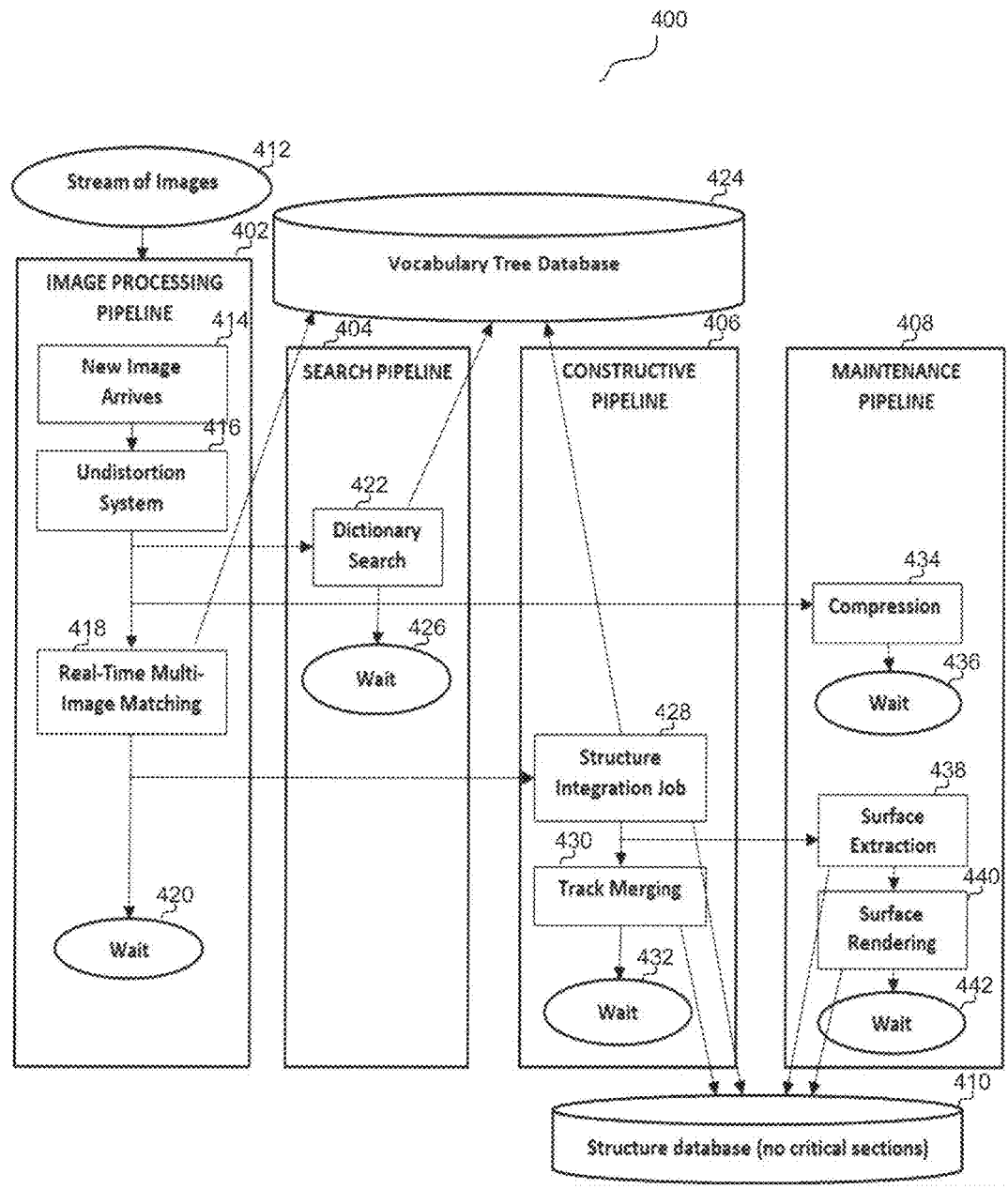
FIG. 4 illustrates a block diagram of 3D reconstruction functionality implemented by four parallel prioritizing job-based thread executor pipelines according to an embodiment.

FIG. 4 illustrates a block diagram 400 of 3D reconstruction functionality implemented by four parallel prioritizing job-based thread executor pipelines in a computational-load-balanced real-time reality modeling system according to an embodiment. The pipelines include an image processing pipeline 402, a search pipeline 404, a constructive pipeline 406, and a maintenance pipeline 408. Each pipeline includes a worker and a queue of abstract jobs. A worker is a software object that has access to a queue data structure of work to be performed, and a thread to execute any work in that queue. An abstract job is a software object that defines a task to be performed, and is presented as a generic interface to a worker, so that the worker can execute it without knowledge of the actual work being performed. The pipelines may run in parallel on a system that includes a CPU and a GPU, and jobs inside each pipeline can use multiple CPU threads or the GPU. However, each pipeline only executes one of the jobs inside it at a time. For example, an structure integration job and a track merging job never execute in parallel within constructive pipeline 406. These jobs are described in further detail below.

In one embodiment, image processing pipeline 402 receives a stream of images 412 and performs feature extraction on them. More specifically, image processing pipeline 402 processes each new image 414 with an undistortion system 416 that undistorts the image and performs feature detection on the image in real-time. Undistortion functionality is described in further detail below. Then, image processing pipeline 402 injects a job with the undistorted image and its features into search pipeline 404 for integration into a vocabulary tree. A vocabulary tree is a data structure that stores quantized representations of features in a hierarchical fashion for extremely fast lookup over, for example, millions of possible features, that enables querying for matching images using an image or a region of an image. A vocabulary tree stores smaller, quantized representations of the features in those images, and can return a sorted list of the most probable images that match the query image, for example, as described by Gálvez-López et al., "Bags of binary words for fast place recognition in image sequences," IEEE Transactions on Robotics 28.5 (2012): 1188-1197.

Image processing pipeline 402 also injects a job with the undistorted image into maintenance pipeline 408 for image compression. In one embodiment, image compression is performed for reducing the bandwidth requirements during GPU processing of the image. Since less data needs to be moved over the GPU's internal memory bus, image compression helps facilitate real-time processing and visualization. Furthermore, image compression enables more scalable data storage on local hardware. Then, image processing pipeline 402 performs real-time multi-image matching 418 on the undistorted image using a vocabulary tree database 424 (including a dictionary database and a feature cache database), and injects a job with the matched images into constructive pipeline 406 for camera position and point cloud estimation. Real-time multi-image matching functionality is described in further detail below. Image processing pipeline 402 then waits 420 to receive another image.

For each job injected in search pipeline 404 by image processing pipeline 402, search pipeline 404 performs a dictionary search 422 on vocabulary tree database 424 and integrates the image into vocabulary tree database 424. Search pipeline 404 then waits 426 to receive another image. Dictionary search functionality is described in further detail below.

For each job injected in constructive pipeline 406 by image processing pipeline 402, constructive pipeline 406 executes a structure integration job 428 to create or extend a 3D reality model including poses and 3D points and integrate the estimates into a structure database 410. Structure database 410 is a global relational data structure containing all poses, world points, images, and their relationships, and including a caching mechanism as well as data structures such as hash tables for relating data. A hash function is any function that can be used to map data of arbitrary size to data of fixed size. The values returned by a hash function are called hash values, hash codes, digests, or simply hashes. A hash table (or hash map) is a data structure used to implement an associative array, a structure that can map keys to values. A hash table uses a hash function to compute an index into an array of buckets or slots, from which the desired value can be found. Structure integration functionality is described in further detail below.

Constructive pipeline 406 then injects a job into maintenance pipeline 408 for visualization of the data. If multiple disparate models have come to exist, constructive pipeline 406 also performs real-time reconstructed track merging 430, and then waits 432 to receive other images. A track refers to a contiguous region of reconstructed structure (world points) and poses, where the poses are in the same frame of reference. Two tracks are sequences of reconstructed frames that are in distinct frames of reference. Merging two tracks includes aligning their common world points and transforming one track completely into the frame of reference of the other. Track merging functionality is described in further detail below.

For each job injected in maintenance pipeline 408 by image processing pipeline 402, maintenance pipeline 408 performs compression 434 to compress the image and generate mip-map hierarchy on GPU, and then waits 436 to receive another image. This is performed in parallel with other pipelines on another thread. Generally, in computer graphics, mip-maps or pyramids are pre-calculated, optimized sequences of images, each of which is a progressively lower resolution representation of the same image. The height and width of each image, or level, in the mip-map is a power of two smaller than the previous level. Mip-maps do not have to be square. They are intended to increase rendering speed and reduce aliasing artifacts.

Further, for each job injected in maintenance pipeline 408 by constructive pipeline 406, maintenance pipeline 408 extracts and extends a triangulated mesh from the newly extended or created reality model as it exists in the global relational data structure (structure database 410), and updates a renderable textured visualization of that model. More specifically, maintenance pipeline 408 performs surface extraction 438 and rendering 440 to render a level-of-detail based scalable triangulated mesh, and then waits 442 to receive other images.

In one embodiment, both constructive pipeline 406 and maintenance pipeline 408 have access to structure database 410. Constructive pipeline 406 and maintenance pipeline 408 may access frequent critical sections around the contents in structure database 410, which may degrade performance. However, one embodiment avoids such performance degradation by allowing constructive pipeline 406 to have write access to data structures in structure database 410 while allowing maintenance pipeline 408 to have read-only access to data structures in structure database 410. That is, maintenance pipeline 408 cannot modify the data structures since it has read-only access. In one embodiment, delegating compression and rendering to the same pipeline (maintenance pipeline 408) ensures that rendering, which uses the mip-map hierarchy of compressed images, always has the hierarchy available when it runs, since rendering is queued in maintenance pipeline 408 until mip-map generation is completed. Further, constructive pipeline 406 is the only place where modifications in the data structures are allowed, thus enforcing serialization of any changes to the data structures. Accordingly, because constructive pipeline 406 serializes the execution of the structure integration functionality and the merging functionality, embodiments prevent the structure integration functionality and the merging functionality from colliding.

In one embodiment, surface extraction 438 within maintenance pipeline 408 is initiated by copying specific subsets of structure that may be modified by a subsequent structure integration job 428 within constructive pipeline 406. In one embodiment, these copies are performed extremely fast (e.g., in less than 1 ms) so they are orders of magnitude faster than critical sections on access. The copying includes subsets of poses and pose/world point relations. Maintenance pipeline 408 is allowed to read world point positions even when they are modified because: (a) they are never modified significantly positionally, and therefore lack of synchronization between any two elements (x,y,z) in any given point is not fatal, and (b) double-precision floating point updates (e.g., writing the x component of a world point's vector into memory by a CPU) are atomic (i.e., appear to the rest of the system to occur instantaneously) on CPUs, thus ensuring that, even though components may be slightly out of synchronization in an asynchronous read operation, each component itself is coherent and not partially updated. Embodiments allow read-only operations on this actively changing data, and the impact of such changes is minimal on the output, and is finally corrected since the latest update will be processed by the maintenance pipeline.

By having the last update trigger a visualization update, the slightly incoherent state is always corrected within seconds in practice. This avoids the need to copy up to gigabytes of world point data, and enables real-time visualization.

As disclosed, embodiments provide multiple pipelines with implied data use contracts that allow load balancing (i.e., no processing core in the system is fully utilized while the other cores are under-utilized). The implied data use contracts allow for load-balancing because parallelizable operations do not need to block on each other, and can perform work using the same data. For example, surface extraction and visualization can continue working while pose estimation and triangulation are performed. This enables real-time processing because large amounts of work are not blocked unnecessarily. Embodiments enable real-time 3D reconstruction by allowing faster data access through minimal critical sections. Generally, standard thread protection mechanisms are prohibitive due to their performance penalty in real-time high-density 3D reconstruction. However, embodiments provide a series of asynchronous pipelines with clear dependencies, and the pipelines are capable of executing discrete units of work within their areas of responsibility, as well as inject jobs into other pipelines as needed to avoid critical sections.

One embodiment utilizes an image processing pipeline, a search pipeline, a constructive pipeline, and a maintenance pipeline. The constructive pipeline is the only pipeline permitted to make changes to the core structure for performing reconstruction. The maintenance pipeline performs read-only operations and is given data via collection jobs, and the search pipeline operates asynchronously to populate a vocabulary tree for fast image searching. Each pipeline can spawn multiple threads to perform jobs faster, while having a master thread. Accordingly, operations can be performed in a way that critical sections are not required while enabling concurrent operations. For example, visualization of the data structures can be performed while the data structures are being grown. Because there are no critical sections and there is no need for mutex protection on shared structures, the engine does not block upon itself. This enables continual flow and real-time reconstruction.

New Image Stream Feature Extraction

Figure 5:
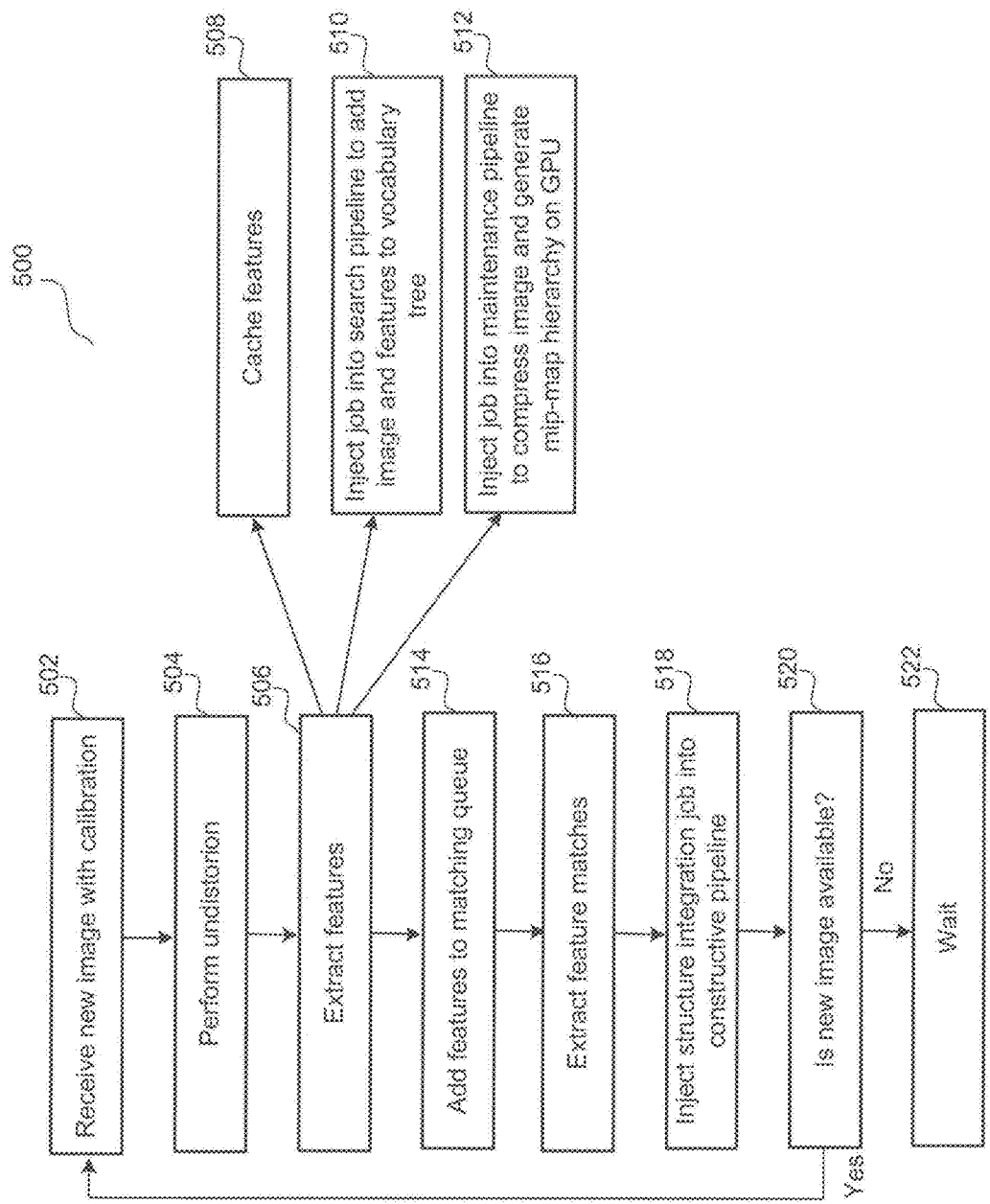
FIG. 5 illustrates a flow diagram of the new image stream feature extraction functionality in an image processing pipeline according to an embodiment.

FIG. 5 illustrates a flow diagram 500 of the new image stream feature extraction functionality in image processing pipeline 402 on a continual sequence of images, according to an embodiment. At 502 a new image with calibration is received. That is, the image is supplied with camera intrinsic parameters in the form of an array of coefficients, as defined herein, so that they do not need to be recovered during incremental reconstruction. At 504 the image is partitioned and undistorted in real-time. Undistortion functionality is described in further detail below. Undistortion may be performed asynchronously using a GPU. At 506 features are extracted from the undistorted image in real-time.

At 508 the extracted features are cached in the feature cache database (within vocabulary tree database 424). At 510 an asynchronous job with the undistorted image and its features is injected into search pipeline 404 for integration of the undistorted image and its features into the vocabulary tree in vocabulary tree database 424. At 512 another asynchronous job with the undistorted image is injected into maintenance pipeline 408 to compress the image and generate mip-map hierarchy using the GPU.

At 514 the features are added to a matching queue. At 516 real-time multi-image feature matching is performed on each sequential pair of the matched images to extract feature matches. Real-time multi-image feature matching functionality is described in further detail below. At 518 an asynchronous structure integration job with matched images is injected into constructive pipeline 406 for position and point cloud estimation to integrate matched frames into world. Structure integration functionality is described in further detail below. At 520 it is determined whether a new image is available, and if not the process waits at 522. If a new image is available, the process loops back to 502.

Real-Time Image Undistortion

Generally, images acquired from sensors have distortion resulting from the lens type (e.g., barrel, fisheye, perspective, etc.). This distortion needs to be removed in order to accurately perform computer vision functionality such as Euclidean 3D reconstruction. This involves solving high-order polynomials and is typically performance intensive. For example, for large images, a GPU may "lock" (i.e., become unresponsive) or a CPU may take minutes to undistort an image. For example, performing an undistortion on massive imagery (such as 24-49 megapixel) can stall a GPU for a brief period of time and create unresponsive applications, and can even cause a crash if the operating system terminates the driver for the GPU.

However, embodiments provide real-time load-balanced lens distortion correction by distributing undistortion tasks over several GPU render cycles, thereby preventing driver timeouts while allowing other use of the GPU.

One embodiment converts an image from a distorted form to an undistorted form in real-time. First, the embodiment generates a grid for the image, where the grid includes an undistortion offset for each pixel, in parallel, by generating portions of the grid in parallel threads and combining the final result into a single grid. This needs to be performed only once for a camera. This grid is itself partitioned into a number (e.g., dozens) of pieces. The partitioned grids are used as source vertex buffers during undistortion, where each grid is rendered using a GPU as an orthographic 3D rendering (representing a three-dimensional object in two dimensions) in a standard 3D render cycle. Accordingly, the embodiment allows the GPU to perform other operations without being stalled or delayed, and performs undistortion in real-time (very fast) by distributing the partitioned undistortion over the GPU's utilization. The embodiment also leverages the GPU's implicit raster interpolation, where a GPU internally performs optimal sampling along raster lines of a triangle formed by any three vertices, thus alleviating the computational burden of interpolating between corrected output pixels, which would impede real-time performance. During correction, the image is stretched or "squished," requiring such interpolation during output rendering.

Some known undistortion approaches are only CPU-side, and are performed by solving the polynomials on a per-pixel basis and then interpolating the undistorted pixels. However, embodiments are orders of magnitude faster than the known systems, and can work in real-time without stalling the computer, by leveraging the aforementioned raster line interpolation available on GPUs, caching the polynomial results for undistortion in a partitioned approach, and distributing it over the GPU's utilization across render loops.

Generally, some known systems implement partitioning for 3D reconstruction. However, embodiments do not partition the image itself. Instead, embodiments partition a corrected vertex grid, and use it to execute rendering. The vertices designate the source pixels and destination pixels in the input image and the corrected image. Accordingly, once the corrected vertices are known, they are placed into partitioned grids of vertices. This also allows for the reuse of a smaller index buffer into those vertices.

In one embodiment, for example, the index buffer requirement for a grid of vertices for a large image is upwards of:

4 indices per pixel×24 million pixels×4 bytes per index=384 million bytes

Accordingly, the index buffer alone can occupy 10% of available video memory on a 4 GB video card. However, by dividing it into 20 pieces, and reusing indices, one embodiment cuts down the memory requirement to 20 MB.

In one embodiment, each smaller vertex buffer is rendered in a standard render loop (e.g., in a 3D engine), which takes very little time (e.g., <5 ms). In comparison, rendering in one buffer would require 100+ ms using standard hardware, which could block user interaction with the computer for 100 ms if the user's display is powered by the same GPU. Further, if other operations slow down this process, the blocking may be longer, and even lead to a crash.

In one embodiment, the render loop for the 3D engine cycles for 20+ frames. During the render operation for each frame, a single partitioned vertex buffer is rendered, and the output image is corrected for that region. At 60 rendered frames per second, this results in a correction over 500 ms, thus maintaining a real-time demand of <1 second. The actual usage is <100 ms, so the GPU is still largely free during this time, having only a 20% duty cycle devoted to the undistortion. Accordingly, the GPU and the application remain responsive, and a large amount of memory is conserved, allowing it to work in conjunction with other software.

Figure 6:
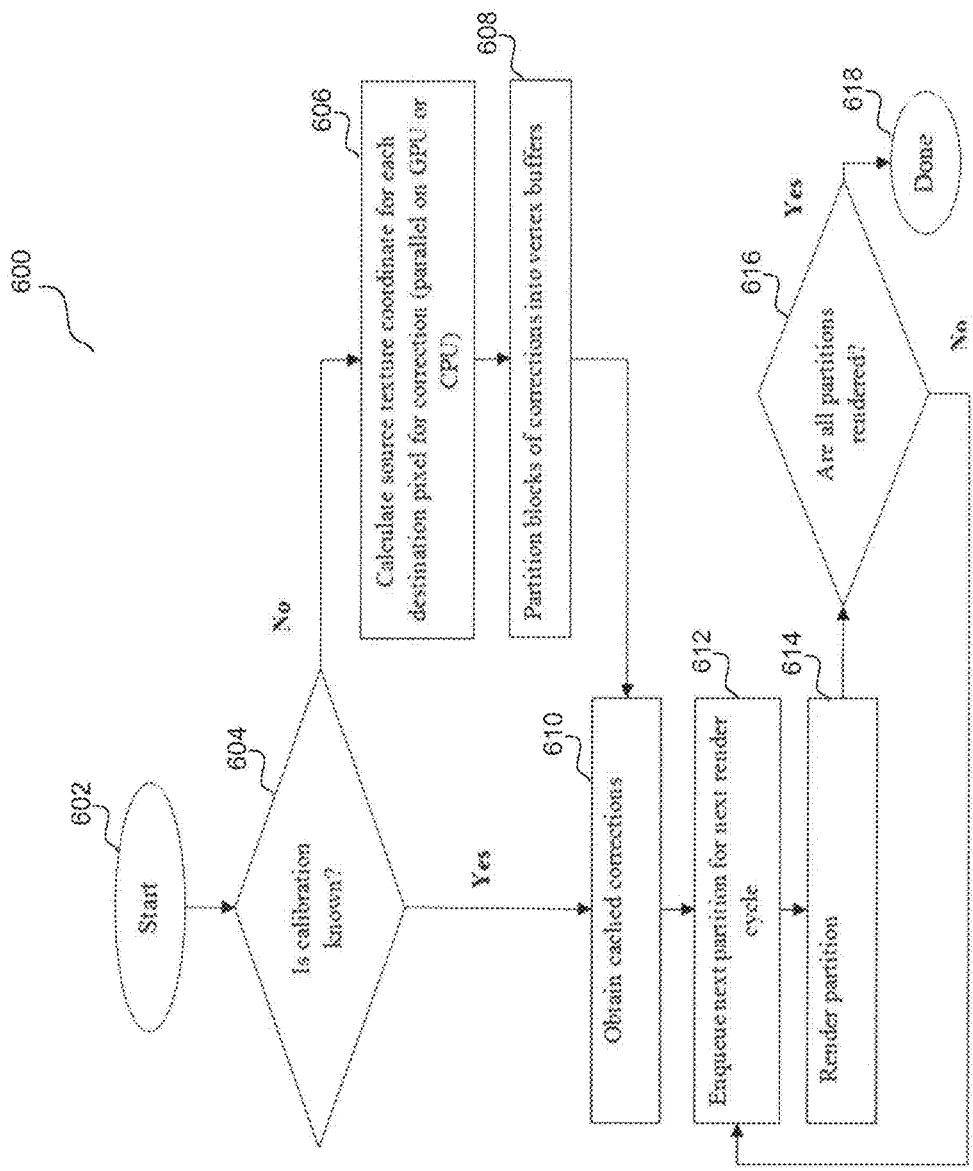
FIG. 6 illustrates a flow diagram of undistortion functionality in the image processing pipeline according to an embodiment.

FIG. 6 illustrates a flow diagram 600 of undistortion functionality in image processing pipeline 402 according to an embodiment. The process starts at 602 when an image is received for undistortion. At 604 it is determined whether a calibration is known for the camera/lens. If there is a known calibration (e.g., a distortion correction has already been generated and cached for that calibration), the process proceeds to 610. If a calibration is not known, at 606 a source texture coordinate for each destination pixel is calculated for correction. For example, given the intrinsic and lens distortion parameters describing a particular camera, corrected pixel values for each pixel in an image produced by that camera are calculated. This may be executed in parallel on CPU and GPU.

At 608 blocks of corrections are partitioned into vertex buffers. More specifically, in one embodiment, the corrected pixel values are partitioned into rectangular segments with respect to the source. In one embodiment, there is a fixed dimensionality to the partition grid, such as 12×10 partitions. For each partition of the corrected pixel values and for each pixel in the partition, the source texture coordinate for the original undistorted image (e.g., (u,v)) is combined with the corrected output Cartesian pixel location (e.g., (x,y)) to produce a vertex (e.g., (x,y,1,u,v), where the third component, "1," is the "w" component in the homogenous coordinate (x,y,w), where the non-homogenous coordinate may be recovered as (x/w, y/w), or (x/1, y/1)). Then, for each partition of the corrected pixel values, the vertices of the partition are uploaded to a vertex buffer within a set of vertex buffers allocated in GPU memory. Finally, all partitions are cached for the given intrinsic and lens parameters.

The process then proceeds to 610 where pre-calculated cached corrections are obtained from a per-image correction cache. The per-image correction cache includes GPU and CPU memory data structures for keeping a correction available for rendering.

At 612 the next partition is enqueued for the next render cycle. At 614 the partition is rendered, using the partition vertex and index buffers, the full source image to correct, and the destination texture containing the output correction. In one embodiment, the rendering is performed by a 3D rendering engine that includes a hardware-accelerated pipeline that executes on the GPU (e.g., a 3D map). More specifically, a destination texture is allocated or obtained for containing the undistorted output. Then, for each partition in the correction for the image, one render operation is scheduled for each successive render loop of the 3D engine so that the GPU is not significantly stalled. During the rendering operation, the 3D engine renders the correction partition to a destination texture using the source image, a common index buffer, and the vertex buffer for the partition, so that for each partition, the segment of the undistorted destination is rendered, where source pixels are sampled using uncorrected texture coordinates and drawn using corrected pixel position coordinates. The common index buffer includes a sequence of numbers which are used as indices to locations of particular vertices, so as to define sequences of triangles, in sequential buffers of vertices existing in the GPU memory.

At 616 it is determined whether all partitions are rendered. If not, the process loops back to 612. If all partitions are rendered, the process ends at 618.

Figure 7:
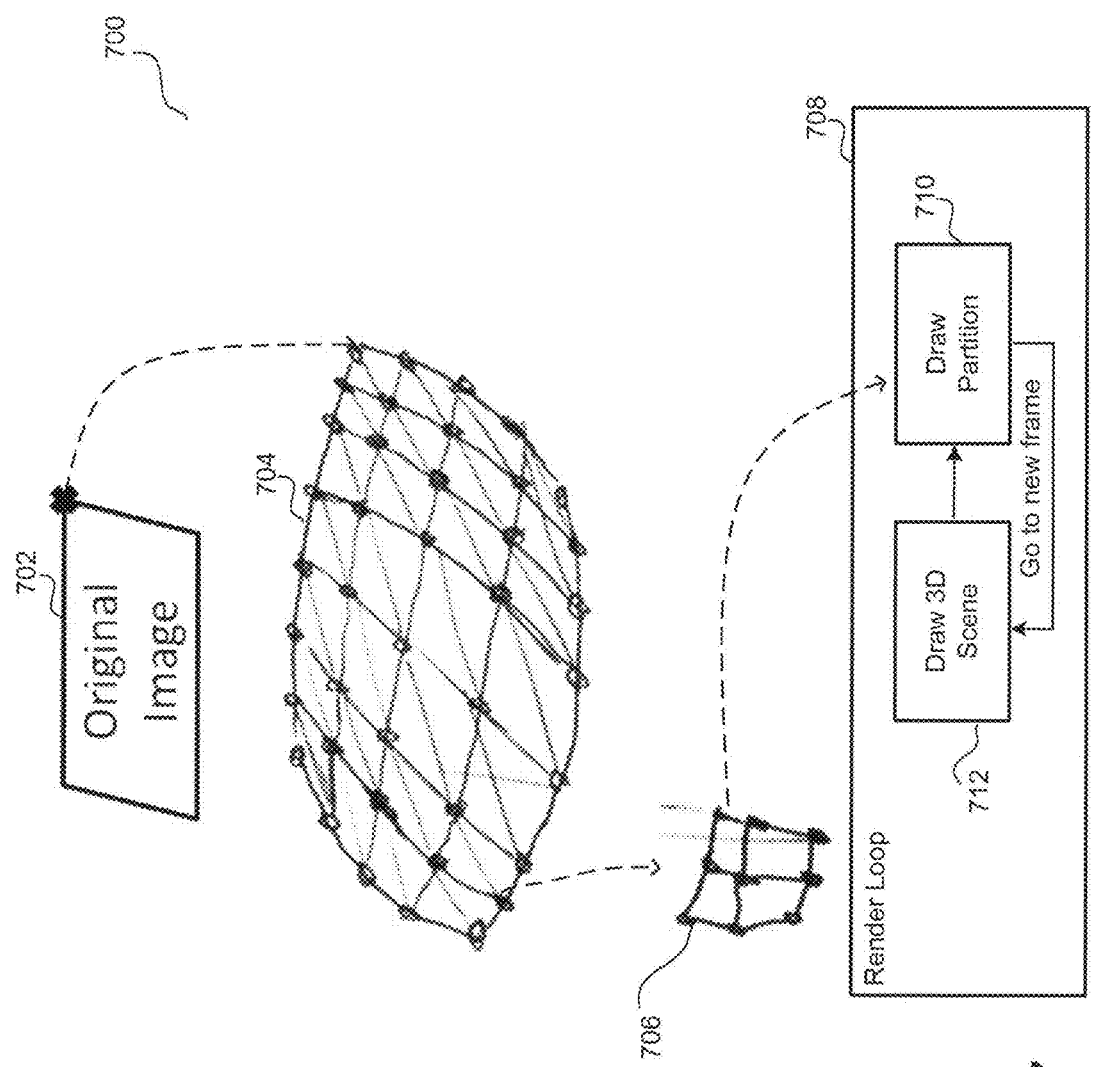
FIG. 7 illustrates a diagram of vertex grid partitioning for image undistortion according to an embodiment.

FIG. 7 illustrates a diagram 700 of vertex grid partitioning for image undistortion according to an embodiment. When an original image 702 is received for which no pre-calculated correction exists, a correction mesh or grid 704 for the image is generated which contains an undistortion offset for each pixel. Grid 704 may be generated in a threaded, parallel operation, in that each correction point can be independently calculated. Grid 704 includes vertices corresponding to texture coordinates from the source original image. The vertex positions contain corresponding corrections to place the corresponding source pixel into a new location. The vertices are indexed to form triangles. Grid 704 is represented as a grid of triangles defined by vertices and indices, since GPUs require triangles (not quads) as inputs for rendering a triangulated mesh. Generation of grid 704 needs to be performed only once for a particular camera.

Grid 704 is itself partitioned into a number (e.g., dozens) of pieces or partitioned grids 706. Partitioned grids 706 are contained in vertex buffers during undistortion, where the vertex buffer for each grid 706 is rendered using a GPU as an orthographic 3D rendering in a standard 3D render cycle/loop 708. At each render loop 708, a 3D scene is drawn 712, and then the respective partition is drawn 710. Loop 708 is repeated once per rendered frame in the render loop, rendering for each partitioned grid 706 in turn.

Real-Time Multi-Image Feature Matching

One embodiment enables real-time extraction of matched features between a number of images. The embodiment provides an adaptively parallelized and multi-level caching feature detection and matching to enable significant performance improvement (e.g., 100 ms for processing 13×12 MP frames). One embodiment implements a multi-level cache (e.g., a disk to GPU memory) that avoids the need to re-extract descriptors and enables re-use of common data across CPU/GPU operations. The embodiment does not overly consume CPU/GPU resources, thus preventing GPU lockups and allowing other systems to use it. In one embodiment, real-time load-balanced multi-image matching enables real-time camera position estimation.

Embodiments provide the fastest feature matching compared to the known systems. For example, embodiments can match features between one image and 12 other images in modern hardware in 100-200 ms, with feature counts upwards of 10000-15000 per image. Without the embodiments, incremental real-time SfM is not possible.

One embodiment performs immediate closure where the features and corresponding world points for each new frame in a 3D reconstruction are immediately linked into the set of surrounding frames, such that real-world detected points of interest are represented only once in the reconstruction and not duplicated due to a lack of connecting frames. Immediate closure refers to using a bag of words (or spatial indexing) to obtain a set of images that are similar. Feature matching (into those frames) can then be performed to determine if there is another frame (or frames) which can be linked into, rather than breaking the track and having to merge later. In order to perform immediate closure, one embodiment extracts tens of thousands of features from a new image or frame and matches those features to potentially dozens of frames, all within the real-time requirement (generally <1 second). That is, matching is performed in far less time compared to the known systems.

Embodiments adaptively modify and distribute the multi-index hashing algorithm over available CPU cores and GPU execution. Multi-index hashing functionality is described, for example, in Mohammad Norouzi et al., "Fast search in hamming space with multi-index hashing," 2012 IEEE Conference on CVPR. Multi-index hashing uses specialized hash tables to find feature match candidates based on shortest Hamming distance. Hamming distance between two strings of equal length is the number of positions at which the corresponding symbols are different. Embodiments time the execution of the algorithm and use the appropriate engine at run-time. One embodiment provides an algorithm that is serialized so that shared data between various matches can be reused in the parallelized execution.

In one embodiment, a set of images can all be matched against a single new image. The embodiment first performs feature detection, which includes extraction of keypoints and generation of corresponding descriptors and hash codes. Accordingly, each image is described by feature descriptors. A descriptor is a float (and sometimes binary) representation of a feature that describes it in a generalized way that can be matched to a descriptor for the same feature in another image, usually by using Euclidean distance. Euclidean distance or Euclidean metric is the "ordinary" (i.e., straight-line) distance between two points in Euclidean space. Euclidean distance can be combined with other tests (such as the ratio test) for eliminating obvious poor matches. For example, one embodiment uses Euclidean distance combined with Lowe's ratio test to avoid having too many false matches. One embodiment implements hash codes that provide more concise hashed representation of the descriptors.

In one embodiment, keypoints and descriptors are extracted from images using a feature detector or feature extractor such as the scale-invariant feature transform ("SIFT") algorithm that uses a difference of Gaussians. In this embodiment, SIFT float descriptors are 512 bit and represent a feature in a scale and rotation invariant manner. In one embodiment, feature descriptors of the new image are first hashed to produce a smaller representation (e.g., 128 bit instead of 512 bit, a random hashing function can perform this, which enables significant performance increases at insignificant cost to matching accuracy), and then split into sparse hash tables using a second specialized hash function, for example, as described by Mohammad Norouzi et al., "Fast Search in Hamming Space with Multi Index Hashing," 2012 IEEE Conference on CVPR. Sparse hash tables are a set of tables (usually 8-10, but may be varied depending on the number of features being tested for performance), which contain a hashed portion or "chunk" of the feature. That is, the whole feature is not represented in each table. Upon a query, the tables are searched with portions or chunks of the query feature, until a table is found that matches, at which point the full matching feature candidate is retrieved for further tests.

For example, one embodiment generates "X" (e.g., usually 8-10, and depending on the number of features that need to be matched) sparse hash tables. The embodiment then splits up each feature in the new image into "X" chunks, and each chunk is then stored in a different hash table. In order to find matches, the embodiment chunks a query and then looks through the hash tables with the chunk until a table is found which may contain a match to the query. The full feature descriptors are then retrieved from memory and matched.

As such, the sparse hash tables describe the descriptors of the new image. Generally, the original CPU implementation has data structures which are not stored in memory in a single continuous memory block. Thus, the sparse hash tables as represented in CPU memory are not stored as a single continuous block. In one embodiment, the sparse hash tables are flattened into a set of flat arrays which provide the data structure necessary to enable fast feature matching on the GPU. The process of flattening these data structures involves aligning the data contained within the data structures into a single continuous memory block. This is advantageous because of the way the GPU accesses and stores memory. Firstly, in order to upload the data to the GPU, the memory needs to be in continuous blocks as memory cannot be uploaded in any other fashion. Secondly, the memory needs to be flat on the GPU in order to get coalesced global memory reads, where coalesced global memory is the slowest but largest memory on GPU. Moreover, allocating GPU memory only once and reusing it is much more efficient than allocating every time. In one embodiment, the sparse hash table is used by multi-index hashing functionality (as described herein) to query against the new image. Embodiments may implement other hash table-based approaches.

In one embodiment, a portion of memory is allocated once on the GPU which is large enough to hold all of the flat hash tables. The allocated memory is then reused for every subsequent matching set where the GPU memory is overwritten with the hash table data of the new image. In one embodiment, a thread pool including two threads continuously matches images against the new image until all images have been matched, where one thread controls the CPU feature matcher and the second thread controls the GPU feature matcher.

Figure 8:
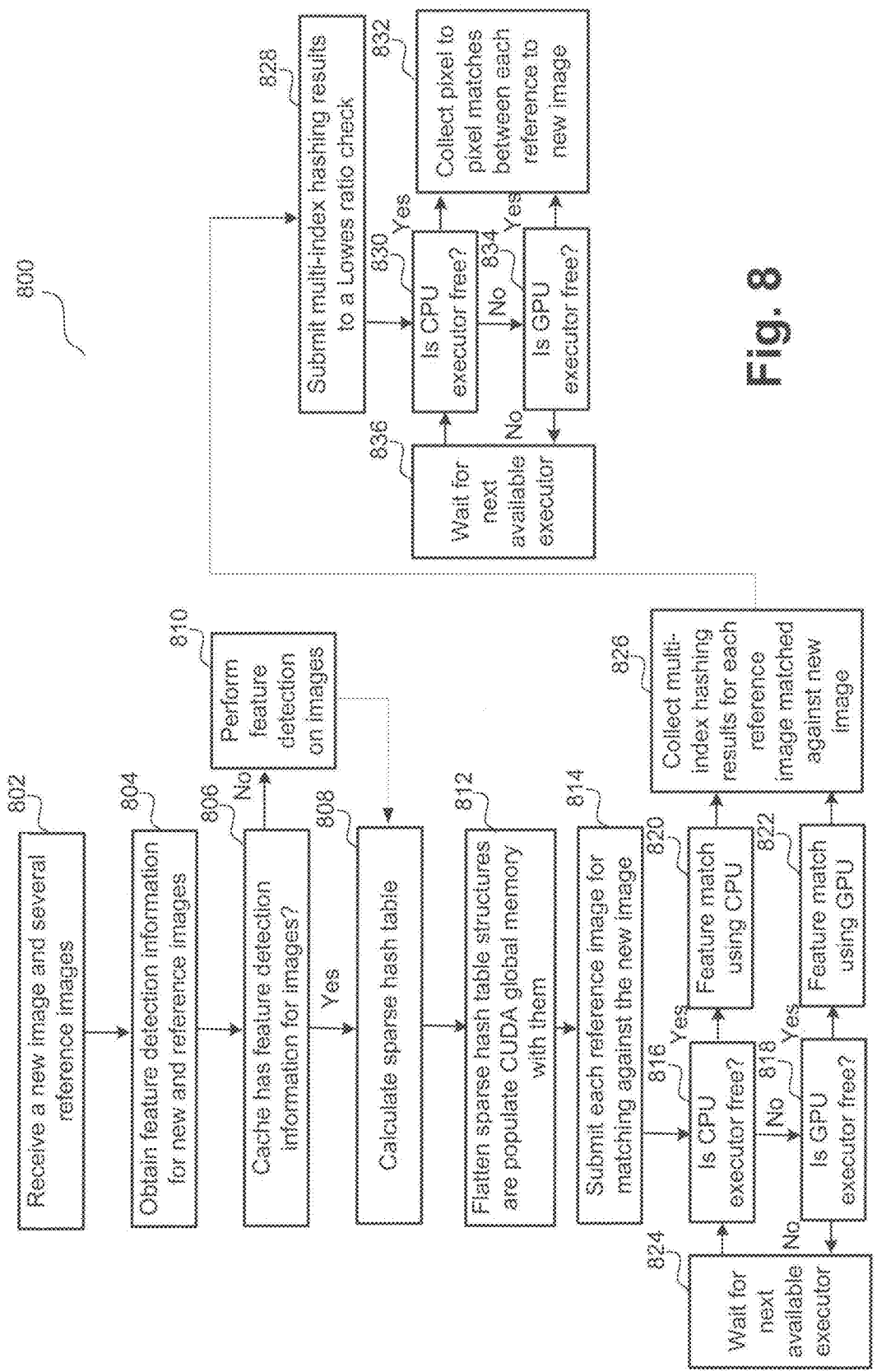
FIG. 8 illustrates a flow diagram of multi-image feature matching functionality according to an embodiment.

FIG. 8 illustrates a flow diagram of multi-image feature matching functionality according to an embodiment. At 802 a new image and several reference images are received for matching. At 804 feature detection information is obtained for each new image and for the reference images. At 806 it is determined whether the cache (in vocabulary tree database 424) has feature detection information for the images. If yes, the process proceeds to 808. If cache does not include feature detection information for the images, at 810 feature detection is performed on the images and then the process proceeds to 808.

At 808 a sparse hash table is calculated to query against using the new image information. At 812 the sparse hash table structures are flattened and a CUDA® global memory is populated with them. At 814 each reference image is submitted for matching against the new image. At 816 it is determined whether the CPU executor is free. The executor is a software object that exists as an instantiation of the modified matching algorithm module which runs either on the CPU or GPU and computes the feature matches between images on demand. If yes, at 820 feature matching is performed using CPU, and the process proceeds to 826. If CPU executor is not free, at 818 it is determined whether the GPU executor is free. If yes, at 822 feature matching is performed using GPU, and the process proceeds to 826. If GPU executor is also not free, at 824 the process waits for the next available executor, and loops back to 816. Embodiments are extensible to multiple CPUs or GPUs.

At 826 multi-index hashing results are collected for each reference image matched against the new image. At 828 multi-index hashing results are submitted to a Lowe's ratio check which is based off of Euclidian distance. Lowe's ratio check is described, for example, in David G. Lowe, "Distinctive Image Features from Scale-Invariant Keypoints," Computer Science Department, University of British Columbia, Vancouver, British Columbia, Canada, Jan. 5, 2004. Lowe's ratio test refers to a test that produces the probability that a match is correct by taking the ratio of the distance from the closest neighboring match out of the feature matches to the distance of the second closest match. In one embodiment, for example, a Lowe's ratio of 0.8 empirically eliminates 90% of the false matches and only discards ~5% of correct matches. This measure performs well because correct matches need to have the closest neighbor significantly closer than the closest incorrect match to achieve reliable matching. For false matches, there will likely be a number of other false matches within similar distances due to the high dimensionality of the feature space. The second-closest match provides an estimate of the density of false matches within this portion of the feature space, and at the same time, identifies specific instances of feature ambiguity.

At 830 it is determined whether the CPU executor is free. If yes, the process proceeds to 832. If CPU executor is not free, at 834 it is determined whether the GPU executor is free. If yes, the process proceeds to 832. If GPU executor is also not free, at 836 the process waits for the next available executor and loops back to 830. At 832 pixel to pixel matches between each reference to new image are collected.

Some known systems also perform 3D reconstruction using any available executors, including CPU and GPU executors. For example, some known systems such as the Open Source Computer Vision ("OpenCV") from Intel Corp. of Santa Clara, Calif., perform matching on the GPU and accelerate on the CPU. However, the known systems do not accelerate in the adaptive, sharing approach of the embodiments. Embodiments minimize any duplication of effort when matching one image against many, thus saving time and enabling fast results. The duplication of effort is reduced by the arrangement of memory in both the matching stage (blocks 814 to 826 in FIG. 8) and ratio check stage (blocks 830 to 836 in FIG. 8).

Generally, in a distributed GPU system, parallel threads must share memory bandwidth, and therefore they can saturate the memory bus quickly if the memory accesses of one thread cannot be overlapped with others (i.e., "coalesce"). However, embodiments prevent this saturation situation. More specifically, one embodiment uses a hash table approach for feature matching, where the descriptors are hashed and the hash codes are placed in tables that can be used to search for similar features. For the CPU executor, using hash tables is effective because CPUs are efficient for random access memory lookups. Accordingly, the embodiment serializes those hash tables into arrays that are preuploaded to the GPU, with indexed arrays for each image. Then, with memory set up appropriately on GPU and CPU side, the next executor is grabbed and the new image is matched against a single reference image out of the set of images. Using serialized arrays enables better use of the GPU memory bus, since for many features being looked up concurrently on the GPU, the same area of the array is being accessed, and memory access tends to "coalesce," meaning as the feature matching progresses through its stages, various features source the same arrays. Accordingly, embodiments more optimally distribute a non-exact approach to matching (based on Hamming distance) across GPUs and CPUs. Embodiments can be extended to other hash table matching algorithms.

In one embodiment, for example, the output below represents timing on an NVIDIA Geforce GTX 960m. It is performing matching of 15000 SIFT features (which are considered slow due to their 512 bit size, compared to binary descriptors or speeded up robust features ("SURF")) against 15000 features in 8 other images, simultaneously. The total time is 161 ms for an equivalent, if brute force was taken, of 1.8 billion matches (15000×15000×8), which can take minutes in comparison on modern CPUs. Thus, embodiments enables real-time performance (<1 second per frame).

:: [1477 matches]: [batchQuery=129 ms] [findBestMatches=32 ms]
:: [1130 matches]: [batchQuery=129 ms] [findBestMatches=32 ms]
:: [908 matches]: [batchQuery=129 ms] [findBestMatches=32 ms]
:: [903 matches]: [batchQuery=129 ms] [findBestMatches=32 ms]
:: [4013 matches]: [batchQuery=129 ms] [findBestMatches=32 ms]
:: [3896 matches]: [batchQuery=129 ms] [findBestMatches=32 ms]
:: [4074 matches]: [batchQuery=129 ms] [findBestMatches=32 ms]
:: [3796 matches]: [batchQuery=129 ms] [findBestMatches=32 ms]
:: [10 hashes] [populate=8 ms] [totalTime=161 ms] [ImagesMatched=8]

In the above functionality, "batchQuery" refers to the matching stage (blocks 814 to 826 in FIG. 8) and "findbestMatches" refers to the ratio check stage (blocks 830 to 836 in FIG. 8).

The disclosed multi-index matching functionality may be implemented in several places in the embodiments, including in image processing pipeline 402 as well as in the track merging and structure integration jobs within constructive pipeline 406 as described in further detail below. The multi-index matching functionality can be instantiated more than once, but since GPUs naturally synchronize execution of operations, the same module can be invoked from multiple threads. In some embodiments, the synchronization for matching may be widened by a critical section to include uploading the features to the CPU or GPU memory, thus improving performance by removing the need to allocate memory for queued matching requests. This does not pertain to the lack of critical sections in the pipelines, since the GPU will block anyway here, and this critical section just ensures that the memory uploads wait.

Dictionary Search

Figure 9:
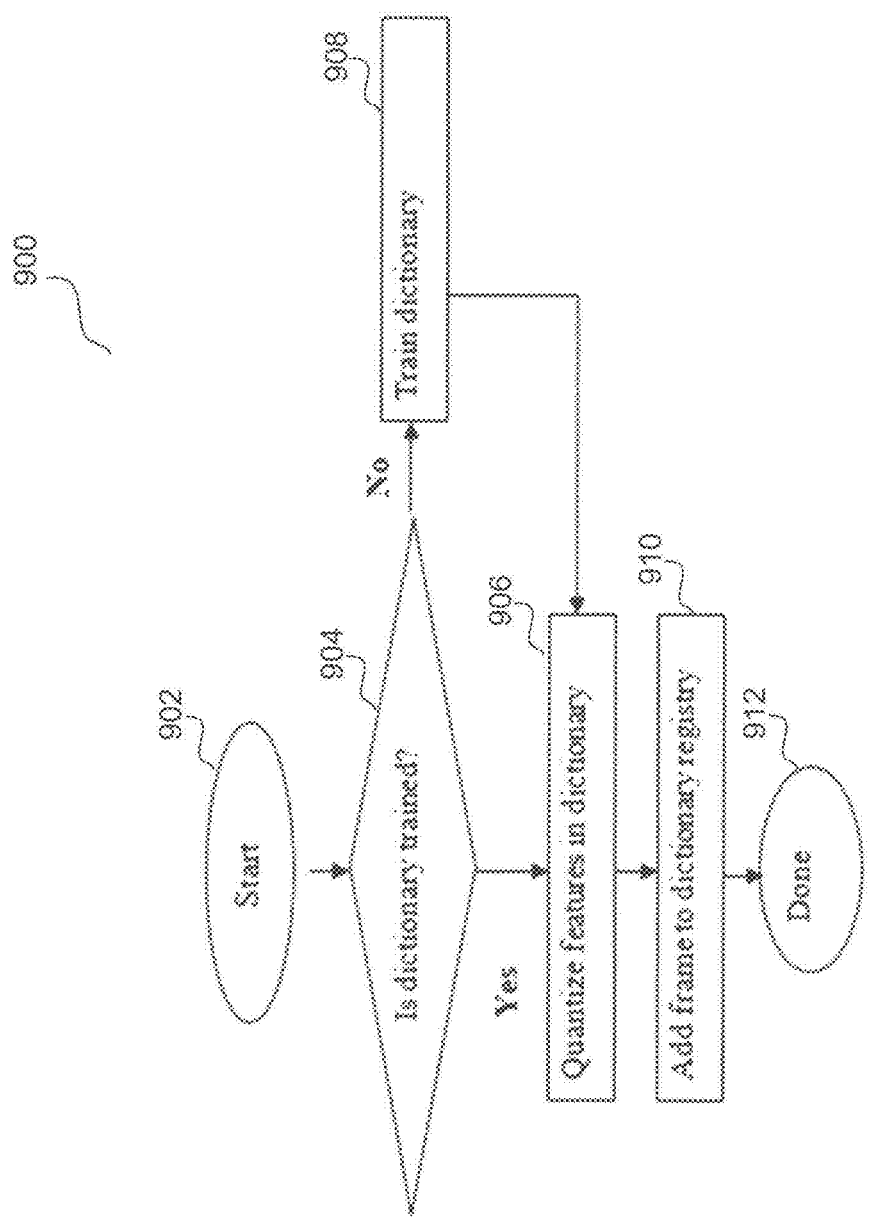
FIG. 9 illustrates a flow diagram of the dictionary search functionality in a search pipeline according to an embodiment.

In one embodiment, upon receiving frames, search pipeline 404 integrates the image into vocabulary tree database 424 by performing dictionary search in parallel with other pipelines on another thread. FIG. 9 illustrates a flow diagram 900 of the dictionary search functionality within search pipeline 404 according to an embodiment. The process starts at 902. At 904 it is determined whether the dictionary is trained. In one embodiment, the vocabulary is structured as a tree, and the dictionary has been trained if the tree structure has been set up such that it contains descriptors (which have been quantized into words) that are assigned an appropriate weighting based on how often they appear in the tree. In one embodiment, training is performed with the features from the first image, and it serves to balance the tree for further queries so that queries of different features take relatively the same amount of time. In one embodiment, for example, it is determined that the dictionary has been trained by checking to see if the vocabulary tree is initialized. If the vocabulary tree is not initialized, the first set of feature descriptors passed to the algorithm are used for training.

If it is determined that the dictionary has been trained, the process proceeds to 906. If not, the dictionary is trained at 908, and the process proceeds to 906. In one embodiment, for example, in order to perform training, the descriptors are discretized into Kw (w visual words) binary clusters by performing k-medians clustering with k-means++ seeding, as described, for example, by Gálvez-López et al., "Bags of binary words for fast place recognition in image sequences," IEEE Transactions on Robotics 28.5 (2012): 1188-1197. The clusters become the first level of nodes in the vocabulary tree. Subsequent levels are created by repeating the operation with the descriptors for each node. Eventually, a tree is obtained with W leaves that are the words of the vocabulary. In the trained vocabulary tree, each word has a weight, and frequent words are assigned a decreased rate, which make them less discriminative.

At 906 features in the dictionary are quantized, that is, they are converted from a feature descriptor into a vocabulary tree vector, where similar features result in similar words based on the quantization function (e.g., discretizing a binary descriptor into visual words). This may be performed using standard feature dictionary approaches, such as the approach described by Gálvez-López et al., "Bags of binary words for fast place recognition in image sequences," IEEE Transactions on Robotics 28.5 (2012): 1188-1197. At 910 the frame is added to the dictionary registry, and at 912 the process ends.

Structure Integration Job

One embodiment provides real-time camera position estimation with drift mitigation for incremental SfM. One embodiment estimates the relative pose of a calibrated sensor, without relying on an IMU or any other sensors. The embodiment creates or extends a 3D reality model that includes poses and 3D points using relative position and 3D point cloud estimation, integrates the estimates into the global relational data structure (structure database 410), injects a job for visualization of the data into maintenance pipeline 408, and if multiple disparate models have come to exist, attempts real-time reconstructed track merging.

In one embodiment, large numbers of feature points are extracted from imagery in parallel, and used to determine an initial relative pose of the sensor. This may be accomplished using any known non-linear relative pose estimator in a random sample consensus ("RANSAC") loop. RANSAC is an iterative method to estimate parameters of a mathematical model from a set of observed data that includes outliers, when outliers are to be accorded no influence on the values of the estimates. Therefore, it also can be interpreted as an outlier detection method. RANSAC finds a result in the presence of inliers by randomly choosing subsets out of all sample data, and attempting to find a solution with that subset. Then, the solution that in turn has the highest number of inliers of the sample set is taken to be the best solution and used to define what constitutes outliers in the sample set.

The relative pose is further refined through "inlier tightening", a sequence of parallelized triangulation and non-linear refinement with variable error margins, to arrive at a more stable pose, at which point error is dramatically reduced. From this "bootstrapped" world, absolute poses are inferred through any known absolute pose estimator based on triangulated points (world points) in a RANSAC loop. The absolute poses are subsequently subjected to a similar inlier tightening scheme by refining the pose with an increasing number of points, by initially starting out with a loose error threshold to include more points, and evaluating those points with tighter thresholds to continually refine the pose while including increasingly superior triangulations.

Simultaneously, massively parallel feature matching is used to link the new absolute pose to several (e.g., up to dozens) of other frames in its vicinity to maximize inclusion of data, where frames are identified using dictionary approaches and relative pose frustum intersections. This "interlocking" is used in the inlier tightening/re-estimation of that pose by adding many more relationships to points and other poses. A frustum defines the spatial viewing area of a camera. It can be defined by a camera position and orientation, and the vertical and horizontal field of view of that camera, and it is thus the pyramid of space that is visible to the camera.

New triangulations are then generated for the new pose (e.g., using both new points and existing points that are seen that exist in up to dozens of other frames). All viable world points are used to perform non-linear refinement on the network of poses in the vicinity (independently per-pose to maximize inlier inclusion in the presence of slight pose error which can cause over-rejection of good matches when considered jointly). This is a key step for producing a stable starting point for bundle adjustment. Finally, a highly parallel bundle adjustment step is run on the network of triangulated points and poses (not the whole reconstruction) for each added frame (observing poses not included in the overlapping frames, but having world points in the overlapping frames locked (not modified during bundle adjustment) to help prevent the local overlapping region from drifting away from the rest of the reconstruction). Further, similarity transform determination is used to detect scale drift and attempt to repair or omit poor frames from reconstruction. Similarity transformations transform objects in space to similar objects.

Some known visual odometry solutions employ relative estimation and absolute estimation, and some widen their inlier culling thresholds to permit more matches. Odometry is the use of data from motion sensors to estimate change in position over time. However, embodiments perform immediate interlocking of other frames in real-time (i.e., matching to 12+ frames) and immediate inlier threshold tightening to re-estimate and perform non-linear pose refinement on the basis of unadjusted world points. Embodiments run in real-time, and improve on scale drift as compared to known approaches that just employ relative estimators and absolute solvers without inlier threshold tightening and interlocking to other frames.

One embodiment provides a method for noise-resistant real-time relative position and 3D point cloud estimation. Upon receiving a continual sequence of matched frames, a search is performed for an integration point into existing structure in a modifiable data structure that maps all poses to all related 3D points, and vice versa. For example, the integration point may be found by locating one of the matched frames in the data structure. Then, existing structure integration is performed by identifying all existing 3D points corresponding to the new matched images and obtaining an initial pose estimate. In one embodiment, for example, a P3P pose position estimator may be implemented.

In one embodiment, in order to obtain the initial pose estimate, first multiple candidates are determined, where each candidate is obtained using the best result from running an absolute pose estimation algorithm in a RANSAC loop. Then each candidate is weighed against the others by the number of inliers it obtained, and each candidate is refined by inlier tightening as described herein with reference to FIGS. 12A and 12B. One embodiment implements an inlier tightening algorithm that includes a loop where poses are estimated and/or refined and inliers are re-evaluated for each cycle, and the inlier threshold is progressively tightened once a particular threshold no longer improves the number of inliers, so that progressively better inputs are used to obtain an improving pose estimate.

Finally, the best candidate is selected as the initial pose estimate. After finding an initial pose estimate, all nearby overlapping existing frames to the initial pose are found using a modifiable 3D spatial partitioning data structure. The modifiable 3D spatial partitioning data structure includes structures that rapidly map 3D space to nearest camera poses. Matches are simultaneously extracted between the new frame and all the nearby overlapping frames using a parallelized feature matcher that matches 1 to n frames. Generally, 3D spatial partitioning refers to the process of storing objects in a data structure that enables lookups of objects in 3D space by their location. It accelerates lookups by using spatial locality to reduce the search space of objects to check. One example is an "octree" which is a power-of-2 segmentation of space into cubic partitions, where each node has eight children, one of each symmetric octet of the cube, divided by two across each axis in 3D space.

A copy of the initial estimated pose is made for each overlapping frame (i.e., per-pose refinement), and each respective copy is refined in parallel for each respective frame. For example, in one embodiment, the world points that were matched for each respective overlapping frame are used in an inlier tightening algorithm (as described herein) to refine the pose copy using a non-linear pose refiner, thus each copy is refined independently of the others. In one embodiment, the pose is refined further using increasingly tighter thresholds at each iteration of the inlier loop. Each copy is refined independently because subtle warping or drift in the initial pose estimate may hinder inlier inclusion for the pose due to the fact that an adjustment to any one overlapping frame may prevent inclusion from the other frames. Thus, refining independently increases inlier inclusion ratios.

Then, the inliers for each overlapping pose are combined, and the initial estimated pose is refined using the non-linear pose refiner and all combined inliers, so as to provide a stable starting point for bundle adjustment.

Subsequently, time-limited partial bundle adjustment is performed using the 3D points with the most observers that are visible in the new frame. The corrections are then replicated to all 3D points by retriangulating using a bulk 3D point triangulator that implements a parallelized algorithm executing in many threads on a GPU. All new possible world points (e.g., 2 or more views) from the new frames are triangulated and inliers are retained. Any 3D points that fail the strictest inlier test are flagged to be excluded in the next integration cycle where they will be re-evaluated in the previous inlier tests. Finally, all structure is integrated into the data structure.

In one embodiment, if the search for sequential integration fails, the integration point may be found by performing an image-based search using vocabulary tree database 424, matching the newest frame against the existing frame with the highest probability of matching, and using these matched images. The existing structure integration is then performed as described previously.

In one embodiment, if both attempts fail (i.e., no integration point is found), a new independent track with the most recent matched frames is "bootstrapped." For example, in one embodiment, first an iterative relative pose is employed in a RANSAC loop to generate an initial pose estimate. The iterative relative pose position estimator is an algorithm that is mathematically over-determinable and compatible with planar scenes, and uses feature correspondences between two frames. Then, the estimate is used with the bulk triangulator to generate 3D points for the matching inlier features, and inlier tightening is performed by re-estimating within an inlier tightening loop. All points are triangulated using the bulk triangulator, and the poses and points are integrated into the data structure as a new reconstruction which is now available for subsequent integration as described previously.

As disclosed, embodiments provide inlier inclusion improvement during immediate closure by allowing new inliers to "bias" the system to include even more inliers, without needing to loosen inlier thresholds too much. In immediate closure, the features and corresponding world points for each new frame in a 3D reconstruction are immediately linked into the set of surrounding frames, so that real-world detected points of interest are represented only once in the reconstruction and not duplicated due to a lack of connecting frames.

Embodiments use spatial octree overlap identification to allow for fast immediate closure (there is no need to match to every frame in the system, thus reducing the search space) with dozens of frames during pose estimation. This avoids more latency. In one embodiment, if sequential assumption fails, the vocabulary tree is now ready (from search pipeline 402), and the embodiment finds a "sequential" insertion point anywhere in the reconstruction. The embodiment uses a similarity transform to detect scale drift and potentially flag a frame as output only, such that it is not used for triangulation or bundle adjustment, and cannot pollute the reconstruction. The embodiment locks world points for pose refinement to ensure a good starting point for bundle adjustment. One embodiment defers inlier/outlier judgment. The embodiment implements world point state tracking that allows for points that are being seen in new views to be re-evaluated across all their frames, thereby maximizing inclusion while filtering possible outliers per frame. Accordingly, an incrementally expanding set of reconstructions (i.e. poses and 3D points in relationship) can be generated in the presence of feature noise in real-time.

Figure 10:
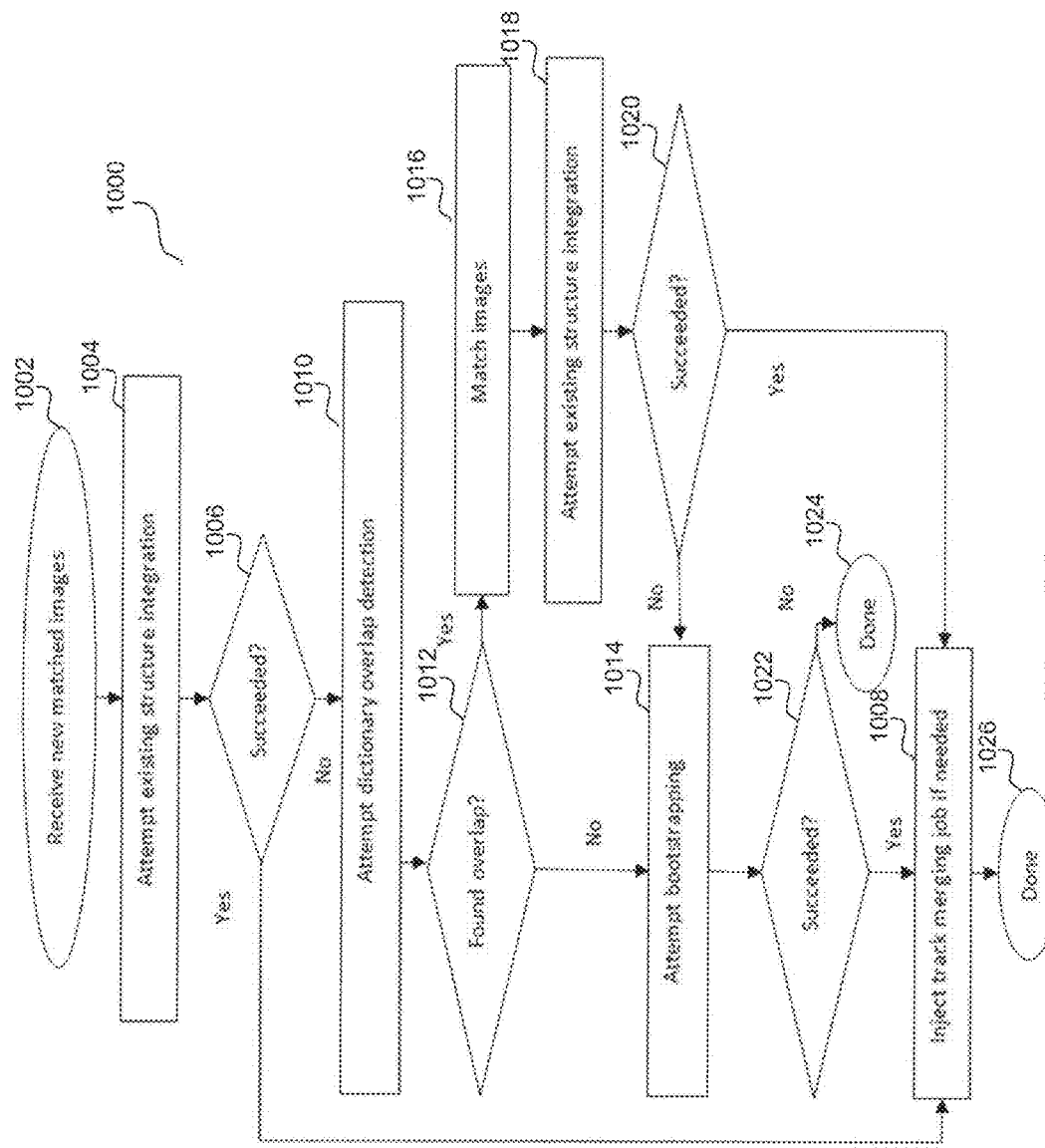
FIG. 10 illustrates a flow diagram of the functionality of a structure integration job in a constructive pipeline according to an embodiment.

FIG. 10 illustrates a flow diagram 1000 of the functionality of the structure integration job in constructive pipeline 406 according to an embodiment. The structure integration job is performed upon receiving frames and in parallel with the other pipelines on another thread. At 1002 new matched images are received. At 1004 existing sequential structure integration is attempted. Existing sequential integration is described in further detail below. At 1006 it is determined whether existing sequential integration has succeeded or not. If yes, the process proceeds to 1008.

If existing sequential integration has not succeeded, overlap detection is attempted at 1010 by accessing the dictionary database (vocabulary tree database 424), which allows for searching for finding the closest matching frame already in the reconstruction. Then, at 1012 it is determined whether any overlap is found. If not, the process proceeds to 1014. If any overlap is found, at 1016 the images are matched for determining highest probability frame from overlap. The images may be matched according to the real-time multi-image matching functionality described herein. Then, at 1018 existing structure integration is attempted. Existing integration is described in further detail below. At 1020 it is determined whether existing sequential integration has succeeded or not. If yes, the process proceeds to 1008. If existing sequential integration has not succeeded, the process proceeds to 1014.

At 1014 relative bootstrapping is attempted. Bootstrapping functionality is described in further detail below. At 1022 it is determined whether relative bootstrapping has succeeded. If not, the process ends at 1024. If relative bootstrapping has succeeded, the process proceeds to 1008.

At 1008, if multiple disparate tracks have come to exist, a track merging job is injected in constructive pipeline 406 to attempt real-time reconstructed track merging. Multiple tracks may come to exist if feature matching is not possible on a sequence of images, such as over water, leading to multiple independent relative tracks. Track merging functionality is described in further detail below. The process then ends at 1026.

Existing Structure Integration

Figure 11:
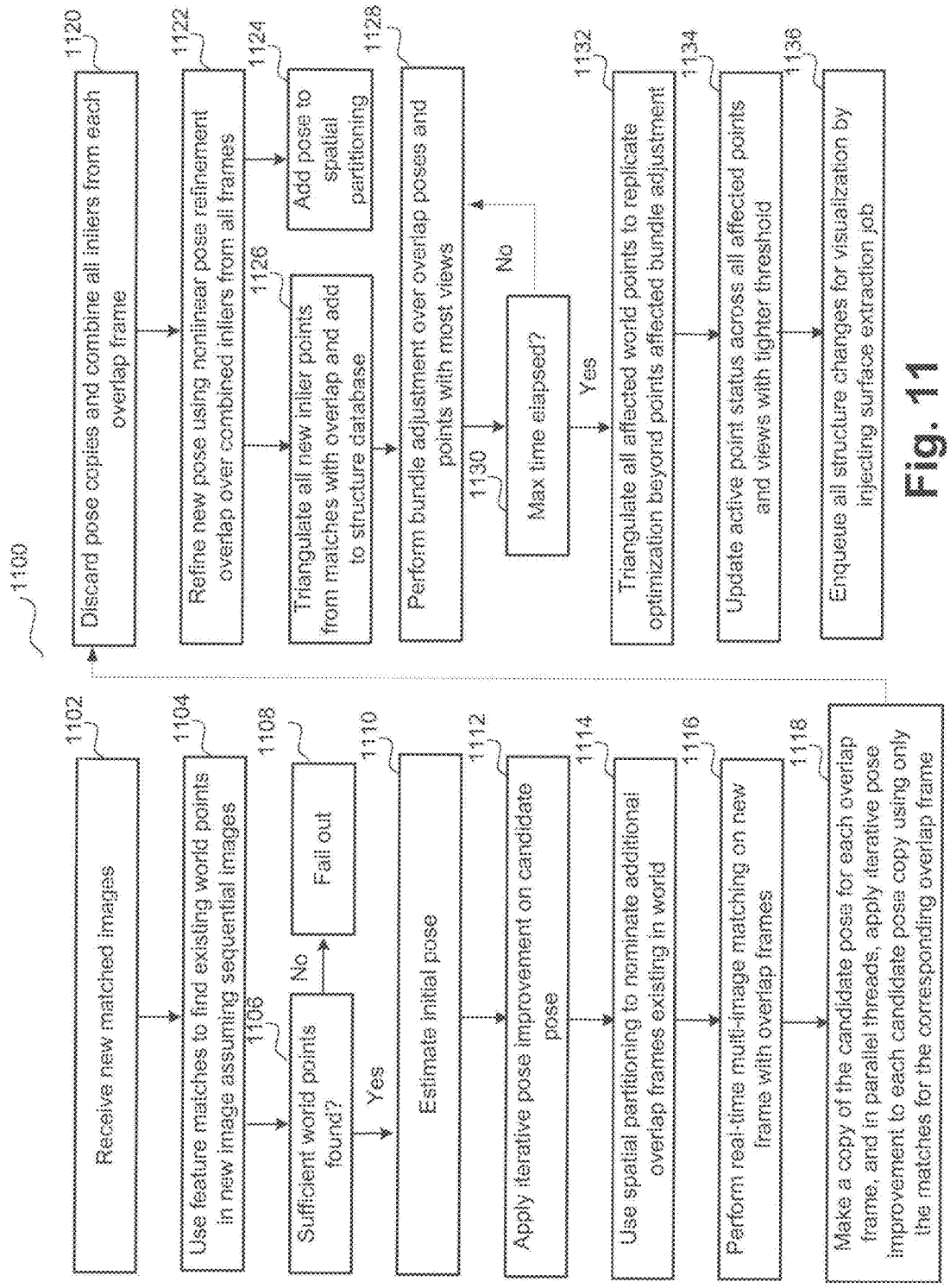
FIG. 11 illustrates a flow diagram of existing structure integration functionality within a structure integration job in the constructive pipeline according to an embodiment.

FIG. 11 illustrates an example flow diagram 1100 of existing structure integration functionality within the structure integration job in constructive pipeline 406 according to an embodiment. At 1102 new matched images are received. At 1104 feature matches are used to find existing world points in the new image assuming sequential images. At 1106 it is determined whether sufficient (e.g., more than 100) existing world points are found. If the number of existing world points found is not enough, at 1108 a fail out is indicated. Otherwise, at 1110 an initial pose is estimated. In one embodiment, an initial absolute pose may be estimated using the absolute estimator in RANSAC (e.g., a P3P) and keeping the pose with the highest inlier count. In one embodiment, RANSAC is performed with an absolute estimator by first selecting a set of subsets of world points, then estimating an absolute pose from each subset, and then testing all world points for outliers against each resulting pose for each subset (e.g., using the reprojection error of the world point when projected into that pose). The pose that has the most inliers may be selected as the most probable candidate pose.

At 1112 iterative pose improvement is applied on the candidate pose. Iterative pose improvement is described in further detail below. At 1114 spatial partitioning (e.g., octree) is used to nominate additional overlap frames existing in the world (e.g., 10 or more frames). At 1116 real-time multi-image matching (as described herein) is performed on the new frame with overlap frames.

At 1118 a copy of the candidate pose is made for each overlap frame, and in parallel threads, iterative pose improvement is applied to each candidate pose copy using only the matches for the corresponding overlap frame. This improves inlier inclusion dramatically with tight thresholds. At 1120 all pose copies are discarded and all inliers are combined from each overlap frame.

At 1122 the new pose is refined using nonlinear pose refinement overlap over combined inliers from all frames.

This provides a good start for bundle adjustment. At 1124 the pose is added to spatial partitioning. At 1126 all new inlier points from matches with overlap are triangulated and added to structure database 410. At 1130 it is determined whether a maximum time has elapsed, so as to maintain a real-time requirement. If not, the process loops back to 1128. If a maximum time has elapsed, at 1132 all affected world points are triangulated to replicate optimization beyond points affected by bundle adjustment.

At 1134 active point status is updated across all affected points and views with tighter threshold. Active point status indicates whether a world point can be used as an input to reconstruction (e.g., pose estimation or refinement). Each point is flagged as active if (a) it has sufficient observers to be considered stable, and (b) it does not have a degenerate angle of incidence, where angle of incidence is the largest angle out of any pair of vectors from the world point to its observing pair of poses (e.g., an angle of "0" would be degenerate and represents a point at a distance of infinity). Active point status may be defined as a minimum angle of incidence (e.g., 2 degrees) and a minimum number of observers (e.g., 3 observers), though these thresholds may vary depending on use and camera resolution. Noise also affects the positional accuracy of world points more with small angles of incidence. This status is re-evaluated for affected points continually. At 1136 all structure changes are enqueued for visualization by injecting a surface extraction job into maintenance pipeline 408.

Iterative Pose Refinement

Figure 12A:
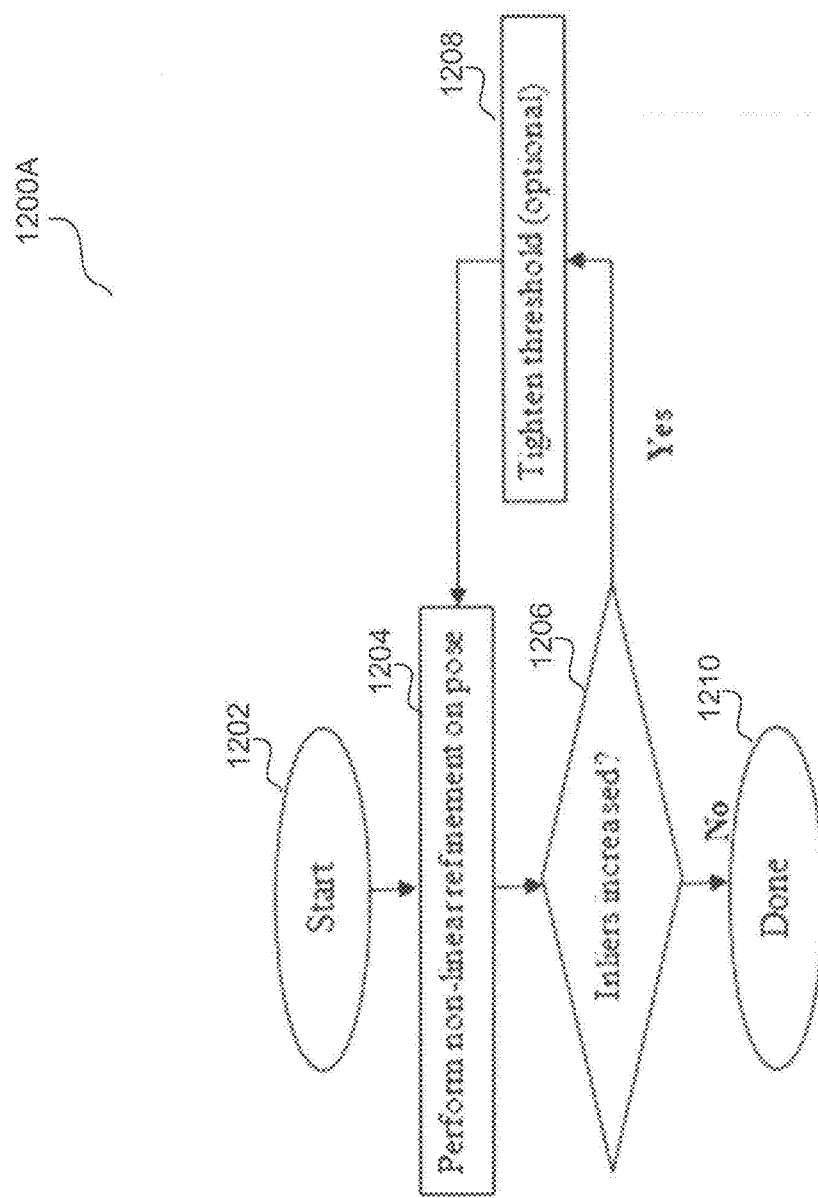
FIGS. 12A and 12B illustrate a flow diagram of iterative pose improvement and an example iterative pose improvement, respectively, according to the embodiments.
Figure 12B:
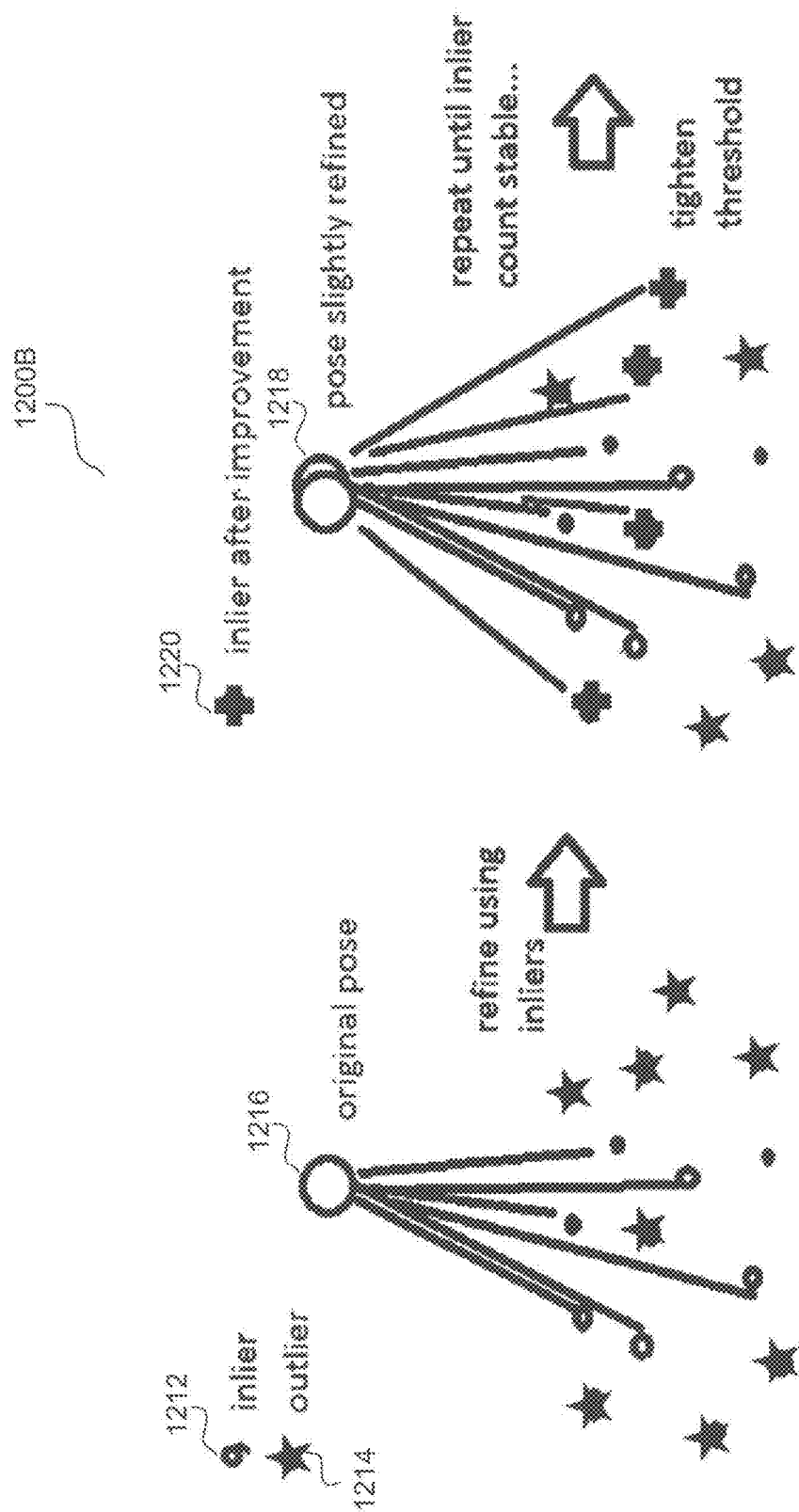

FIG. 12A illustrates a flow diagram 1200A of iterative pose improvement in one embodiment. The process starts at 1202. At 1204 non-linear refinement is performed on the pose. At 1206 it is determined whether inliers have increased. If so, at 1208 the threshold is optionally tightened and the process loops back to 1204. If inliers have not increased, the process ends at 1210. The iterative pose improvement of FIG. 12A is re-usable and may be employed in existing structure integration functionality, as well as in the bootstrap functionality described below. FIG. 12B illustrates an example 1200B of iterative pose improvement in an embodiment. A number of inliers 1212 and a number of outliers 1214 are determined for an original pose 1216. Pose 1216 is then slightly refined to obtain refined pose 1218, potentially resulting in further inliers 1220 after pose improvement. The refining step is then repeated until inlier count becomes stable. The threshold may be optionally tightened at each refining step.

Generally, some know systems also improve inliers by moving thresholds. However, the known systems bring in world points from multiple frames, while embodiments use spatial partitioning with an initial guess to skip the need for looking up frames using a dictionary approach. Spatial partitioning is extremely fast, and embodiments search for frames that overlap the candidate pose frustum (the containing shape of the field of view of the camera) by using a sequential assumption. This makes finding overlaps extremely fast, and therefore enables real-time performance. Further, using the frames from partitioning, embodiments apply inlier improvement to a copy of the candidate pose for each overlapping frame independently. In some embodiments, a dictionary approach is used to integrate frames that fail the sequential arrival assumption.

Generally, if the inlier threshold is too low, bad points are included, thus resulting in distortion of reconstructions. If the inlier threshold is too high, the lack of a fit between all the overlap frames with the candidate prevents enough good points from being included (e.g., less than 20% of points). However, in embodiments, applying iterative inlier improvement on a copy of the candidate using only the world points from that overlapping frame allows for very tight thresholds, thus maximizing good inlier point inclusion for the new frame with respect to that overlapping frame. This maximizes inlier inclusion since error can prevent jointly evaluating all inliers for all overlapping frames against a single pose, since adjusting the pose to fit the world points in one overlapping frame may exclude good points in another overlapping frame. Embodiments perform this for all overlapping frames in parallel, combine the inliers into one set, discard each copy, and perform a final refinement using all those inliers on the pose. This produces a stable starting point for bundle adjustment, as bundle adjustment is subject to a local minima and therefore needs a good starting point. As a result, embodiments find a good camera pose in the presence of noise and outliers and new structure based on existing world points, while maximizing inlier inclusion across all overlapping frames.

Bootstrapping

Generally, bootstrapping is the process of generating an initial reconstruction from a pair of frames. The output is an initial relative world recovered from those frames, consisting of an arbitrary Cartesian frame of reference, a set of triangulated world points, and a pair of poses defined relative to each other, within the frame of reference. The frame of reference is generally defined by the local camera space of an assumed pose at origin for the first frame (no rotation or translation), and the second frame is defined as a relative orientation and translation with respect to the first frame.

Generally, some known systems implement algorithms such as the 5 point or the 8 point relative pose estimation for bootstrapping. However, these algorithms do not effectively handle planar scenes, and they are too sensitive to noise. In contrast, embodiments rely on a relative pose estimator that can start from a known rotation and find the correct rotation from there. In one embodiment, rather than using an actual known rotation, the bootstrapping phase assumes very little rotation has happened. That is, it uses an identity rotation (starts with no rotation).

For example, one embodiment implements the relative pose estimator disclosed by Laurent Kneip et al., "Direct Optimization of Frame to Frame Rotation," 2013 IEEE ICCV. The embodiment uses a Levenberg-Marquardt minimization strategy to solve for relative pose (using 10 points). This is based on an assumption that images are arriving sequentially, so there is translation but minimal rotation between any two images. In one embodiment, the pose solution from the assumed starting point is used as a starting point rotation in a recursive inlier tightening loop. This improves the inliers included, while increasingly refining the pose and including more inliers, in the presence of noise.

Accordingly, embodiments provide an initial relative world (with world points and two poses), using a sequential assumption and an assumption of small initial rotation that leads recursively to better results, while handling planar scenes and noise.

Figure 13:
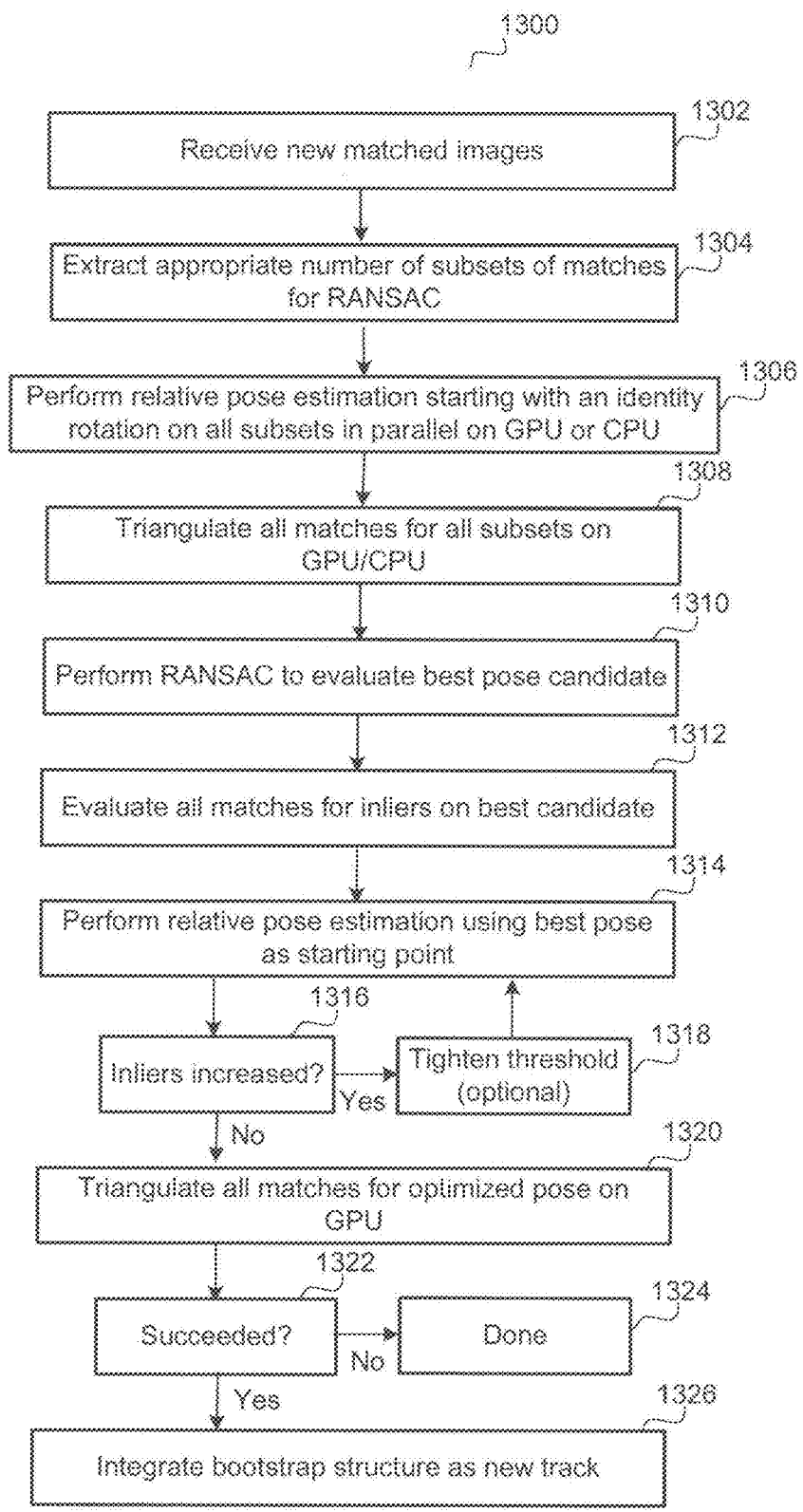
FIG. 13 illustrates a flow diagram of bootstrap functionality within the structure integration job in the constructive pipeline according to an embodiment.

FIG. 13 illustrates a flow diagram 1300 of bootstrap functionality within structure integration job in constructive pipeline 406 according to an embodiment. At 1302 new matched images are received. At 1304 an appropriate number of subsets of matches are extracted for RANSAC. At 1306 relative pose estimation is performed starting with an identity rotation on all subsets in parallel on GPU or CPU. This assumes sequential frames and can work on small rotations and handle planar scenes.

At 1308 all matches are triangulated for all subsets on GPU/CPU. At 1310 RANSAC is performed to evaluate the best pose candidate. At 1312 all matches are evaluated for inliers on the best pose candidate. In order to refine the relative pose, at 1314 relative pose estimation is performed again using the best pose candidate as the starting point (i.e., re-estimation with more inputs can serve as refinement). In 1306, only the points for each subset were used to produce the initial candidate pose. In contrast, at 1314, all inlier points are used to re-estimate the pose, since the relative estimator can be over-determined to produce a better result. By using the initial best candidate pose during this step as a starting point for estimation, local minima are avoided when estimating the rotation with all inliers. This produces improved rotation to the initial relative candidate pose selected in 1310, which thus results in more inliers being included and more outliers being rejected.

At 1316 it is determined whether inliers have increased. If so, at 1318 the threshold is optionally tightened, and the process loops back to 1314. If inliers have not increased, at 1320 all matches are triangulated for optimized pose on GPU. At 1322 it is determined whether the bootstrapping for the pose has succeeded by checking whether the number of triangulated points exceeds some threshold (e.g., 50 world points). If not, the process ends at 1324. If the pose estimation, optimization, and triangulation succeeded by producing a relative world with sufficient world points, at 1326 the bootstrap structure is integrated as a new track.

Track Merging

One embodiment provides real-time merging of separate incrementally generated reconstructions. The embodiment combines the vocabulary tree (for starting point) and octree spatial partitioning to maximally interlock all overlapping frames between two disparate reconstructions.

Generally, separate reconstructions must be created when sequential images fail to reconstruct. This results in unaligned, incomplete reconstructions. However, embodiments take two or more incrementally growing reconstructions and merge them into a single reconstruction. In one embodiment, upon creation of a second track, the track merging functionality is activated and scheduled for operation upon the addition of each new frame. A second track is created in circumstances such as a failure to obtain sufficient matches to continue an existing reconstruction, or when a reconstruction is started from another location with no overlap. For example, a second track is created when the structure integration job fails to link the current frame into the current track. Usually, not enough matched features are found between the image and the ones around it to get an accurate pose addition, and therefore a new track is started instead. The tracks are then merged together later when an image overlaps the previous track better.

One embodiment employs a dictionary-based approach using an existing vocabulary tree to detect the optimal "anchor" point for aligning the reconstruction with another. The vocabulary tree produces a number of candidates of varying probabilities. The embodiment performs parallelized matching between the anchor frames in each reconstruction, and applies an adaptive similarity transform in a RANSAC loop upon those matches to determine what shared triangulations are inliers across both tracks. The embodiment robustly scores the candidate transforms, chooses the best one, and then transforms one entire track into the other.

The embodiment then performs a "cascading alignment" down the track by using the geometry of the track to reduce required matching. This includes identifying the matches between newly overlapping frames in the merge, and determining all inlier triangulations using an inlier tightening approach where the thresholds are increasingly tightened to initially account for divergence in the merge (so as to not over-eliminate inliers), and then tightened as the tracks are adjusted to fit each other. Bundle adjustment is applied once a stable merge is achieved with sufficient interlocking between frames.

Figure 14:
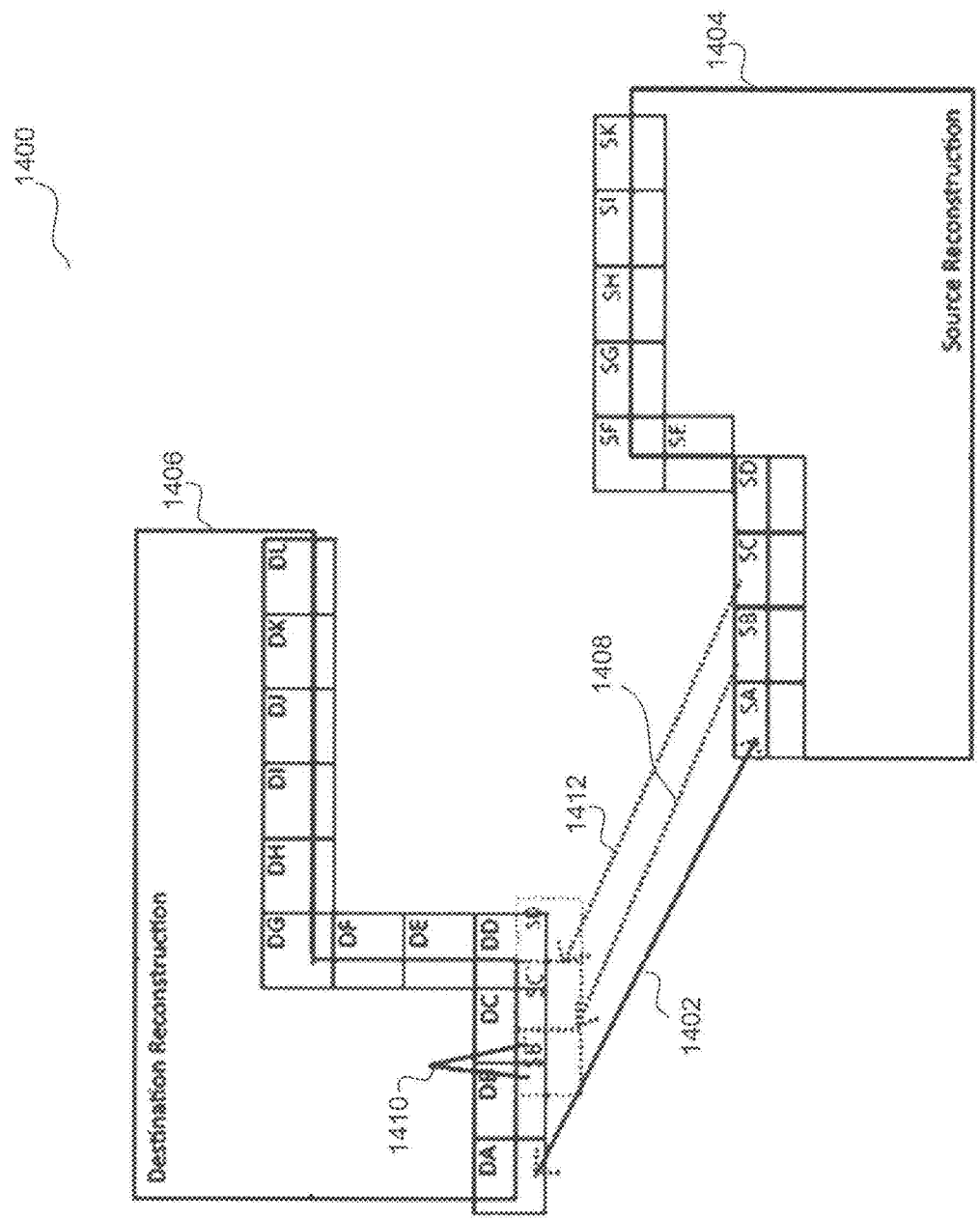
FIG. 14 illustrates an example of cascading alignment functionality in one embodiment.

FIG. 14 illustrates an example cascading alignment 1400 in one embodiment where the octree is used for one image in a source track to find the images which overlap in a destination track. The frames are then feature matched to determine which feature matches have active world points in both the source and the destination track. First, at 1402 a transformation between a source reconstruction 1404 and a destination reconstruction 1406 is computed by merging an anchor point. Then, at 1408, a source frame SB of source reconstruction 1404 is transformed into destination reconstruction 1406 as SB' using the transformation obtained at 1402. Then, at 1410, using the spatial octree, it is determined that SB' only overlaps frames DB and DC of destination reconstruction 1406, and therefore these frames are matched to find duplicate world points. Then, at 1412 the process of 1404 and 1406 is repeated for frames SC-SK of source reconstruction 1404 to find all possible duplicates to refine the transformation. In FIG. 14, the overlap between frames DA-DL and SA-SK is not illustrated for clarity.

Some known systems use point cloud alignment. However, embodiments pertain to an incremental reconstruction, while the known systems simply perform registration between point clouds to align reconstructions. Generally, point cloud alignment refers to any algorithm that can determine a similarity transform (including a rotation, a translation, and a scale factor) that maps one point cloud (including a set of world points) to a corresponding point cloud in another frame of reference. For example, one embodiment implements the point cloud alignment functionality described in Umeyama et al., "Least-squares estimation of transformation parameters between two point patterns," IEEE Transactions on pattern analysis and machine intelligence, 13.4 (1991): 376-380.

As another example, one embodiment may implement point cloud alignment functionality using iterative closest point algorithms. Iterative closest point is an algorithm employed to minimize the difference between two clouds of points. It is often used to reconstruct 2D or 3D surfaces from different scans, to localize robots and achieve optimal path planning (especially when wheel odometry is unreliable due to slippery terrain), to co-register bone models, etc. In this algorithm, one point cloud (vertex cloud), the reference, or the target, is kept fixed, while the other one, the source, is transformed to best match the reference. The algorithm iteratively revises the transformation (combination of translation and rotation) needed to minimize an error metric, usually the distance from the source to the reference point cloud.

Embodiments do not merely perform point cloud alignment, which can be very costly for massive point clouds. Embodiments combine similarity in images and reconstruction geometry to reduce the amount of points required to be considered, and also perform multi-image feature matching to identify shared points for alignment (which improves the result), while a real-time reconstruction is running.

One embodiment provides a method for real-time merging of separate reality models. First, a set of separate 3D reconstruction models are received, where the most recent model to receive a frame integration is considered the source track, and the other model is considered the destination track. Then, an image-based search using vocabulary tree database 424 is performed on the most recently integrated frame into the source track. Alternatively, a brute force approach may be implemented to iterate over a number of previous frames (e.g., about 40) in the destination track and match.

More specifically, the images which match the newest frame are submitted to a parallelized feature matcher (for matching 1 to n frames) in order to obtain 2D feature correspondences between the two models. Using the 2D matches between the newest frame and each frame in the destination track, the 3D world points are looked up using a modifiable data structure in structure database 410. The modifiable data structure includes poses and 3D world points for each model, and provides the ability to lookup 3D world points given a frame identifier and its 2D correspondence in the frame. Each set of 3D world points linking the models are used to determine a transformation between the models.

More specifically, multiple transformations are obtained, where each candidate transformation is obtained using a point cloud alignment algorithm in a RANSAC loop. Each transformation is used to move the source world points into the destination model or move the destination world points into the source model. Each transformation is ranked by computing the number of world points which are inliers when transformed between the tracks. The best transformation is determined accordingly. Then, using the inlier determining algorithm, the list of world points matched between the structures is trimmed down to only include the world points that are inliers when transformed between the models. From the set of the best selected transforms, the best overall transform is selected.

More specifically, the number of inliers between each model is computed for each set of world points, using an inlier determining algorithm which can determine world points that are inliers in a particular model for a given camera pose. The average number of inliers is computed for that transform, and the best overall transform is selected which has the highest average inlier rate. Then, using a modifiable 3D spatial partitioning data structure in structure database 410 with each source pose as a query, all of the overlapping frames between the two models is determined. The modifiable 3D spatial partitioning data structure includes structures that rapidly map a 3D space to nearest camera poses. Then, a global unique set of world points linking the two models is collected.

More specifically, each pose in the source track is transformed into the destination track. All of the possible overlapping frames are found in the destination track using the spatial partitioning data structure. For each overlapping frame pair, the 2D feature correspondences are determined using the parallelized feature matcher. Using the modifiable data structure, the 3D world point correspondences are determined. Then, the global world point set is made by only integrating the new 3D point correspondences, and duplicate correspondences are ignored. Then, using the inlier determining algorithm, the list of global world points is culled down to only include inlier world points, and the best transform along with the global set of 3D world point correspondences the modifiable data structure is updated.

More specifically, all of the world points in the source model are transformed into the destination model, and all of the source model world points which were matched between the two models are marked as duplicates. Then, all of the poses in the source model are transformed into the destination model. The pose information for each matched world point in the destination structure is updated with the relevant pose information from its corresponding source world point, and the references to the source model are removed from the modifiable data structure.

Accordingly, the modifiable data structure is up to date and now contains one less model. If there are no match results which reside in the destination track, the merge attempt is aborted.

Figure 15:
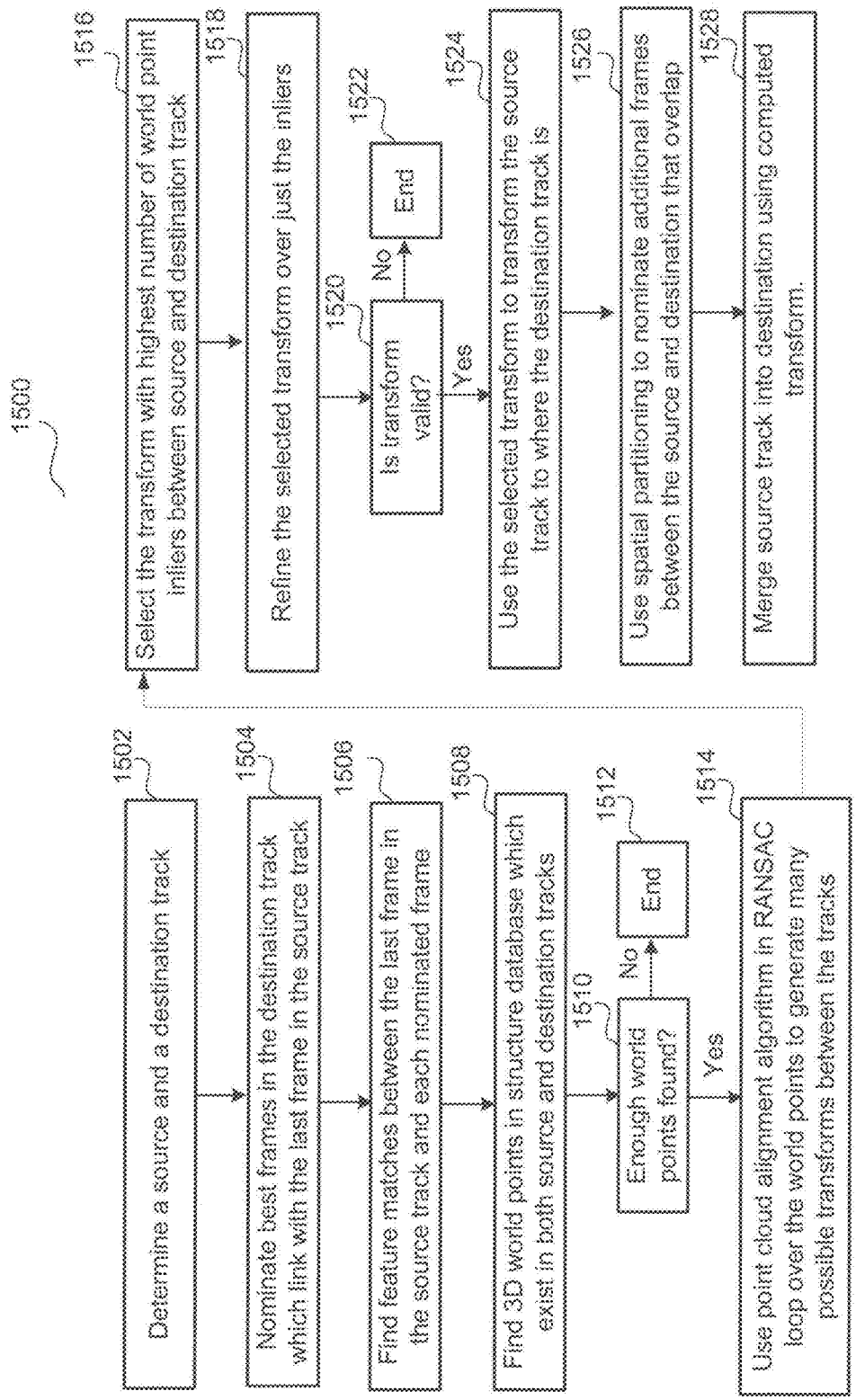
FIG. 15 illustrates a flow diagram of track merging functionality in the constructive pipeline according to an embodiment.

FIG. 15 illustrates a flow diagram 1500 of track merging functionality in constructive pipeline 406 according to an embodiment. At 1502 a source and a destination track are determined, where the source track is to be merged into the destination track. At 1504 a dictionary database is used to nominate best frames in the destination track which link with the last frame in the source track. At 1506 feature matches are found between the last frame in the source track and each nominated frame, using real-time multi-image matching as described herein. At 1508 feature matches between source and destination frames are used to find 3D world points in the structure database which exist in both the source and destination tracks. At 1510 it is determined whether enough world points (e.g., 50 world points) have been found. If not, the process ends at 1512.

If enough world points have been found, at 1514 the point cloud alignment algorithm in RANSAC loop is used over the world points to generate many possible transforms between the tracks. At 1516 the transform which has the highest number of world point inliers between the source and the destination track is selected. At 1518 the selected transform is refined over just the inliers. At 1520 it is determined whether the transform is valid. If not, the process ends at 1522.

If the selected transform is valid, at 1524 it is used to transform the source track to where the destination track is. At 1526 spatial partitioning is used to nominate additional frames between the source and the destination that overlap, in order to find all overlapping world points. At 1528 the source track is merged into the destination track using the computed transform.

Figure 16:
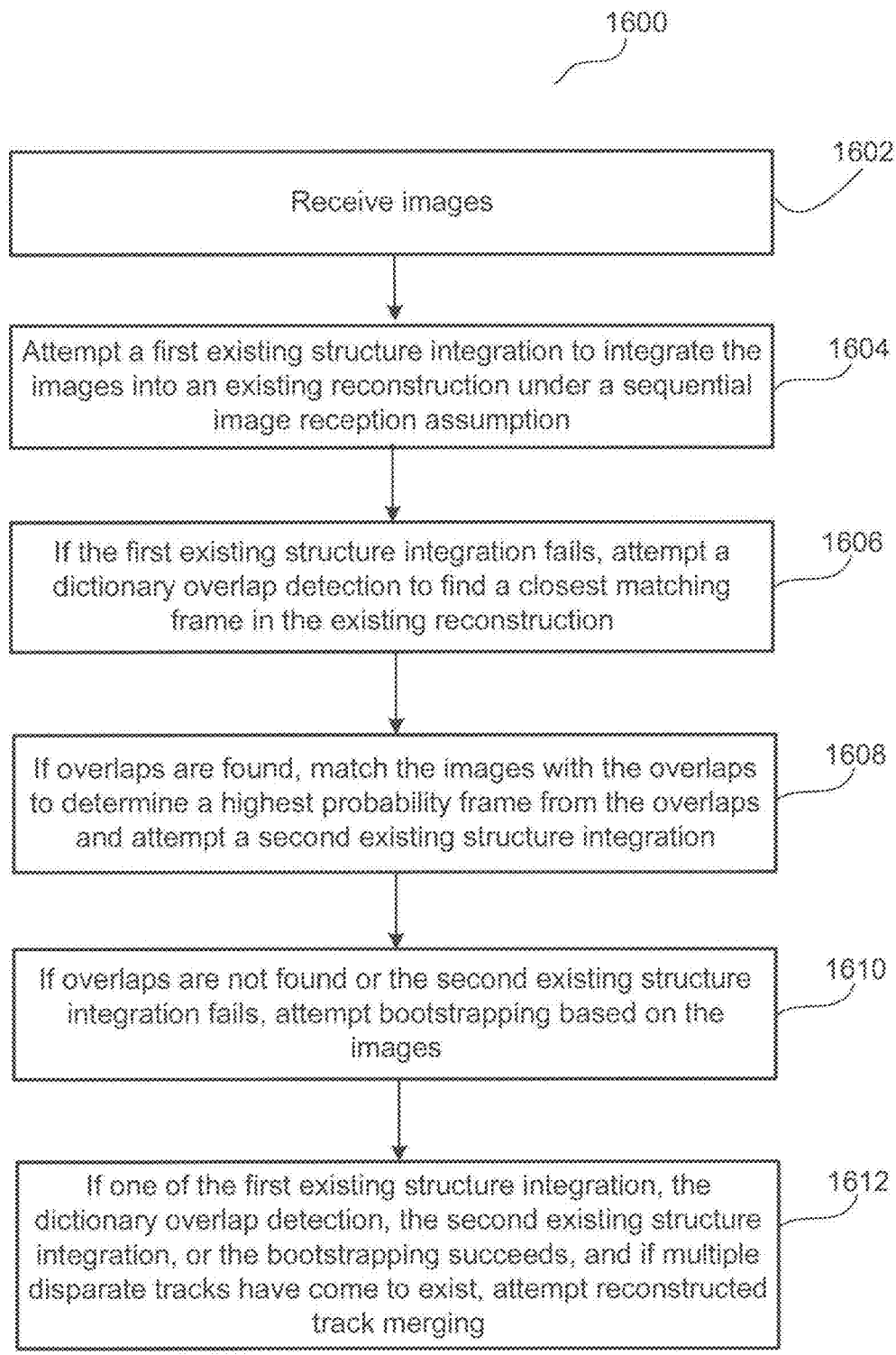
FIG. 16 is a flow diagram of the operation of the 3D reconstruction module of FIG. 1 when performing 3D reconstruction in accordance with embodiments of the present invention.

FIG. 16 is a flow diagram 1600 of 3D reconstruction module 16 of FIG. 1 when providing camera position and point cloud estimation for 3D reconstruction in accordance with embodiments of the present invention.

At 1602 images are received, and at 1604 a first existing structure integration is attempted to integrate the images into an existing reconstruction under a sequential image reception assumption. If the first existing structure integration fails, at 1606 a dictionary overlap detection is attempted by accessing a dictionary database and searching to find a closest matching frame in the existing reconstruction. If overlaps are found, at 1608 the images are matched with the overlaps to determine a highest probability frame from the overlaps, and a second existing structure integration is attempted under the sequential image reception assumption. If overlaps are not found or the second existing structure integration fails, at 1610 bootstrapping is attempted based on the images. If one of the first existing structure integration, the dictionary overlap detection, the second existing structure integration, or the bootstrapping succeeds, and if multiple disparate tracks have come to exist, at 1612 reconstructed track merging is attempted.

In one embodiment, the images include a new image and corresponding matched images. In one embodiment, the first existing structure integration includes using feature matches to find existing world points in the new image under the sequential image reception assumption; if sufficient existing world points are found, estimating an initial relative pose; refining the initial relative pose to obtain a refined pose; nominating additional existing overlap frames through spatial partitioning; matching the new image with the additional existing overlap frames; making a copy of the refined pose for each overlap frame and refining each copy; discarding all pose copies and combining all inliers from each overlap frame; refining the refined pose using combined inliers from the additional existing overlap frames to obtain a further refined pose and add it to the spatial partitioning; triangulating all new inlier points and adding them to a structure database; performing bundle adjustment over overlap poses and points with most views; triangulating all affected world points; and updating active point status across all affected points and views.

In one embodiment, the copies of the refined pose are refined in parallel threads. In one embodiment, the refining of each copy of the refined pose is performed using only matches for a corresponding overlap frame. In one embodiment, the bundle adjustment is run on a network of triangulated points and poses for each added frame by observing poses not included in overlapping frames and locking world points in the overlapping frames. In one embodiment, the refining of the initial relative pose includes applying iterative pose improvement on the initial relative pose. In one embodiment, the refining of the initial relative pose includes inlier tightening, a sequence of parallelized triangulations, and non-linear refinement with variable error margins, to obtain the refined pose. In one embodiment, each point is flagged as active if it has sufficient observers to be considered stable and it does not have a degenerate angle of incidence. In one embodiment, all structure changes are enqueued for visualization.

In one embodiment, estimated structures are integrated into a structure database. In one embodiment, the structure database includes a global relational data structure including all poses, world points, images, and their relationships, and including a caching mechanism and data structures for relating data.

As disclosed, embodiments provide a load-balanced, locally executing approach that can handle high-detail model generation and provide a real-time 3D reconstruction from images. Embodiments may perform 3D reconstruction on a local desktop or laptop computer with a GPU and a CPU, while still enabling that computer to perform other functions. By leveraging a GPU in lieu of distributing over many CPUs, embodiments avoid the need to upload data to a cloud computing service which may be costly and unavailable and consume time for transferring data. Embodiments can process moving points by using a robust inlier assessment system and fusing disparate reconstructions in real-time. One embodiment achieves real-time performance by narrowing the search space through spatial partitioning (thus allowing for lookups of nearby objects by location), and making a general assumption that frames will arrive sequentially (thus allowing for rapid integration).

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method for camera position and point cloud estimation for three-dimensional (3D) reconstruction, comprising:
   receiving images;
   attempting a first existing structure integration to integrate the images into an existing reconstruction under a sequential image reception assumption;
   if the first existing structure integration fails, attempting a dictionary overlap detection by accessing a dictionary database and searching to find a closest matching frame in the existing reconstruction;
   if overlaps are found, matching the images with the overlaps to determine a highest probability frame from the overlaps and attempting a second existing structure integration under the sequential image reception assumption;
   if overlaps are not found or the second existing structure integration fails, attempting bootstrapping based on the images; and
   if one of the first existing structure integration, the dictionary overlap detection, the second existing structure integration, or the bootstrapping succeeds, and if multiple disparate tracks have come to exist, attempting reconstructed track merging.

2. The method of claim 1, wherein the images comprise a new image and corresponding matched images, wherein the first existing structure integration comprises:
   using feature matches to find existing world points in the new image under the sequential image reception assumption;
   if sufficient existing world points are found, estimating an initial relative pose;
   refining the initial relative pose to obtain a refined pose;
   nominating additional existing overlap frames through spatial partitioning;
   matching the new image with the additional existing overlap frames;
   making a copy of the refined pose for each overlap frame and refining each copy;
   discarding all pose copies and combining all inliers from each overlap frame;
   refining the refined pose using combined inliers from the additional existing overlap frames to obtain a further refined pose and add it to the spatial partitioning;
   triangulating all new inlier points and adding them to a structure database;
   performing bundle adjustment over overlap poses and points with most views;
   triangulating all affected world points; and
   updating active point status across all affected points and views.

3. The method of claim 2, wherein the copies of the refined pose are refined in parallel threads.

4. The method of claim 2, wherein the refining of each copy of the refined pose is performed using only matches for a corresponding overlap frame.

5. The method of claim 2, wherein the bundle adjustment is run on a network of triangulated points and poses for each added frame by observing poses not included in overlapping frames and locking world points in the overlapping frames.

6. The method of claim 2, wherein the refining of the initial relative pose comprises applying iterative pose improvement on the initial relative pose.

7. The method of claim 2, wherein the refining of the initial relative pose comprises inlier tightening, a sequence of parallelized triangulations, and non-linear refinement with variable error margins, to obtain the refined pose.

8. The method of claim 2, wherein each point is flagged as active if it has sufficient observers to be considered stable and it does not have a degenerate angle of incidence.

9. The method of claim 2, wherein all structure changes are enqueued for visualization.

10. The method of claim 1, wherein estimated structures are integrated into a structure database.

11. The method of claim 10, wherein the structure database comprises a global relational data structure including all poses, world points, images, and their relationships, and including a caching mechanism and data structures for relating data.

12. A non-transitory computer readable medium having instructions stored thereon that, when executed by a processor, cause the processor to provide camera position and point cloud estimation for three-dimensional (3D) reconstruction, the processor:
receiving images;
attempting a first existing structure integration to integrate the images into an existing reconstruction under a sequential image reception assumption;
if the first existing structure integration fails, attempting a dictionary overlap detection by accessing a dictionary database and searching to find a closest matching frame in the existing reconstruction;
if overlaps are found, matching the images with the overlaps to determine a highest probability frame from the overlaps and attempting a second existing structure integration under the sequential image reception assumption;
if overlaps are not found or the second existing structure integration fails, attempting bootstrapping based on the images; and
if one of the first existing structure integration, the dictionary overlap detection, the second existing structure integration, or the bootstrapping succeeds, and if multiple disparate tracks have come to exist, attempting reconstructed track merging.

13. The computer readable medium of claim 12, wherein the images comprise a new image and corresponding matched images, wherein the first existing structure integration comprises:
using feature matches to find existing world points in the new image under the sequential image reception assumption;
if sufficient existing world points are found, estimating an initial relative pose;
refining the initial relative pose to obtain a refined pose;
nominating additional existing overlap frames through spatial partitioning;
matching the new image with the additional existing overlap frames;
making a copy of the refined pose for each overlap frame and refining each copy;
discarding all pose copies and combining all inliers from each overlap frame;
refining the refined pose using combined inliers from the additional existing overlap frames to obtain a further refined pose and add it to the spatial partitioning;
triangulating all new inlier points and adding them to a structure database;
performing bundle adjustment over overlap poses and points with most views;
triangulating all affected world points; and
updating active point status across all affected points and views.

14. The computer readable medium of claim 13, wherein the copies of the refined pose are refined in parallel threads.

15. The computer readable medium of claim 13, wherein the refining of each copy of the refined pose is performed using only matches for a corresponding overlap frame.

16. The computer readable medium of claim 13, wherein the bundle adjustment is run on a network of triangulated points and poses for each added frame by observing poses not included in overlapping frames and locking world points in the overlapping frames.

17. The computer readable medium of claim 13, wherein the refining of the initial relative pose comprises applying iterative pose improvement on the initial relative pose.

18. The computer readable medium of claim 13, wherein the refining of the initial relative pose comprises inlier tightening, a sequence of parallelized triangulations, and non-linear refinement with variable error margins, to obtain the refined pose.

19. The computer readable medium of claim 13, wherein each point is flagged as active if it has sufficient observers to be considered stable and it does not have a degenerate angle of incidence.

20. A system for camera position and point cloud estimation for three-dimensional (3D) reconstruction, the system comprising:
a processor; and
a memory coupled with the processor and storing instructions that, when executed by the processor, cause the processor to:
receive images;
attempt a first existing structure integration to integrate the images into an existing reconstruction under a sequential image reception assumption;
if the first existing structure integration fails, attempt a dictionary overlap detection by accessing a dictionary database and searching to find a closest matching frame in the existing reconstruction;
if overlaps are found, match the images with the overlaps to determine a highest probability frame from the overlaps and attempt a second existing structure integration under the sequential image reception assumption;
if overlaps are not found or the second existing structure integration fails, attempt bootstrapping based on the images; and
if one of the first existing structure integration, the dictionary overlap detection, the second existing structure integration, or the bootstrapping succeeds, and if multiple disparate tracks have come to exist, attempt reconstructed track merging.

\* \* \* \* \*